US012710510B2

(12) United States Patent
Jeannin et al.

(10) Patent No.: US 12,710,510 B2
(45) Date of Patent: Aug. 18, 2026

(54) DEVICE AND METHOD FOR METHOD FOR CALIBRATING A TRANSMITTER OF A RADAR SYSTEM

(71) Applicant: Infineon Technologies AG, Neubiberg (DE)

(72) Inventors: Mayeul Jeannin, Augsburg (DE); Farhan Bin Khalid, Munich (DE); Dian Tresna Nugraha, Antapani (ID); Andre Roger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 247 days.

(21) Appl. No.: 18/413,280

(22) Filed: Jan. 16, 2024

(65) Prior Publication Data

US 2024/0248171 A1 Jul. 25, 2024

(30) Foreign Application Priority Data

Jan. 25, 2023 (DE) ..................... 10 2023 101 817.5
Dec. 6, 2023 (DE) ..................... 10 2023 134 119.7

(51) Int. Cl.
*G01S 7/40* (2006.01)
*G01S 7/35* (2006.01)

(52) U.S. Cl.
CPC ............ *G01S 7/4008* (2013.01); *G01S 7/354* (2013.01); *G01S 7/356* (2021.05)

(58) Field of Classification Search
CPC ........ G01S 7/4008; G01S 7/354; G01S 7/356; G01S 13/325; G01S 13/345; G01S 13/42; G01S 13/584; G01S 13/931
See application file for complete search history.

(56) References Cited

U.S. PATENT DOCUMENTS 10,958,298 B2 * 3/2021 Tiebout ..................... H03F 3/24
11,614,531 B2 * 3/2023 Wu ..................... G01S 13/449 342/149

(Continued)

FOREIGN PATENT DOCUMENTS

EP 4009074 A1 6/2022

OTHER PUBLICATIONS

Mayeul Jeannin et al., "Modeling and Removing Doppler Division Multiplexing Spurs in Automotive MIMO Radar" Published Jan. 15, 2023.

*Primary Examiner* — William Kelleher
*Assistant Examiner* — Ismaaeel A. Siddiquee
(74) *Attorney, Agent, or Firm* — Eschweiler & Potashnik, LLC

(57) ABSTRACT

A method for calibrating a transmitter of a plurality of transmitters of a radar system is provided. The method includes setting the radar transmitter to be calibrated to a first Doppler Division Multiplexing (DDM) pattern and associating each of the other transmitters in the plurality with a respective second DDM pattern. A target is detected by performing radar detection with the plurality of transmitters, wherein the transmitter is operated with the first DDM pattern and each of the other transmitters is operated with its associated second DDM pattern, extracting Doppler Fourier transform coefficients for a Doppler spectrum peak corresponding to the target and for spurs associated with the peak, applying an inverse discrete Fourier transform to the extracted Doppler Fourier transform coefficients, detecting a phase error of the transmitter using a result of the inverse discrete Fourier transform and calibrating the transmitter according to the detected phase error.

23 Claims, 20 Drawing Sheets

(56) References Cited

U.S. PATENT DOCUMENTS

2021/0389420 A1 * 12/2021 Roger .................... G01S 13/34
2023/0333208 A1 10/2023 Jeannin et al.

* cited by examiner

100

200
201
202
203
204
205
206
207
208
Spectrum analyzer

500
MMIC
Phase shifter
TX1
TX2
TX3
Range-FFT
Doppler-FFT
Peak detection
Target selection
Constellation error estimation
$K_i$
$z^{-1}$
$c_k[m]$
501
502
503
504
505
506
507
508
509
510
511
512
513
514

DFFT complex peaks
706
707
707
707
IFFT
Spur lying on the "true" velocity bin
705
701
702
703
704
$\tilde{\delta}_{0°}$
$\tilde{\delta}_{90°}$
$\tilde{\delta}_{180°}$
$\tilde{\delta}_{270°}$ 1400
1401
Set radar transmitter to be calibrated to elevated DDM pattern
1402
Detect target
1403
Extract Doppler FFT coefficients of the peak corresponding to the target and of the peak's spurs
1404
Apply IDFT
1405
Detect phase error from IDFT result
1406
Calibrate transmitter according to the detected phase error

Power (dB)

0
-20
-40
-60
-80

50
100
150
200
250

Velocity (bin)

IFFT
1701
Tx1 and Tx2
Tx1 QPSK
Tx2 3PSK
Power (dB)
Velocity (bin)
0
-20
-40
-60
-80
-100
-120
-140
-160
-180
50
100
150
200
250

FIG 18

DEVICE AND METHOD FOR METHOD FOR CALIBRATING A TRANSMITTER OF A RADAR SYSTEM

CROSS REFERENCE TO RELATED APPLICATIONS

This application claims priority to German Patent Application 10 2023 134 119.7, filed on Dec. 6, 2023, and to German Patent Application 10 2023 101 817.5, filed on Jan. 25, 2023, the contents of which are hereby incorporated by reference in their entirety.

TECHNICAL FIELD

Exemplary implementations described herein generally relate to devices and methods for calibrating a transmitter of a radar system.

BACKGROUND

A Doppler Division Multiplexing (DDM) radar system, has, in comparison to a Time Division Multiplexing (TDM) radar system, improved SNR (signal-to-noise ratio), improved maximum unambiguous velocity, and allows decoupling of Doppler angle dimensions and compression of data. It comprises multiple transmit antennas to realize multiple transmit channels, wherein the transmit channels are realized by having successive chirps with phase offsets generated by respective phase shifters that differ between the antennas.

SUMMARY

According to various embodiments, a method for calibrating a transmitter of a radar system comprising a plurality of transmitters is provided. The method includes setting a radar transmitter to be calibrated among the plurality of radar transmitters to a first Doppler Division Multiplexing pattern and associating each of the other transmitters of the plurality of transmitters with a respective second Doppler Division Multiplexing pattern. Different relationships between the first Doppler Division Multiplexing pattern and the second Doppler Division Multiplexing pattern are disclosed to address different numbers of transmitters and types of multiplexing patterns. The method includes detecting a target by performing radar detection with the plurality of transmitters, wherein the transmitter to be calibrated is operated with the first Doppler Division Multiplexing pattern and each of the other transmitters of plurality of transmitters is operated with its associated second Doppler Division Multiplexing pattern, extracting Doppler Fourier transform coefficients for a Doppler spectrum peak corresponding to the target and for spurs associated with the peak, applying an inverse discrete Fourier transform to the extracted Doppler Fourier transform coefficients, detecting a phase error of the transmitter to be calibrated using a result of the inverse discrete Fourier transform and calibrating the transmitter to be calibrated according to the detected phase error.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 16 illustrates example Doppler FFT outputs in case of a calibration using a second approach.

FIG. 18 illustrates an example with four transmitters.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

In DDM radar systems, if a phase shifter enabling the respective modulation (in particular the offset) for a transmit channel is not accurate enough, harmonics will appear at a level high enough to be detected and interpreted as weak targets. Such ghost targets are also called spurs. Their localization next to a target in the Doppler spectrum is predictable. Nonetheless, calibration of the phase shifter is needed to limit such artifacts. Unfortunately, radar system parameters tend to drift away from the calibrated state during the life cycle. Therefore, efficient approaches for online calibration of phase shifters are desirable.

Figure 1:
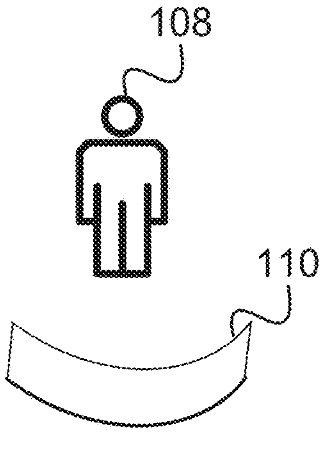
FIG. 1 shows an example radar arrangement.
Figure 1:
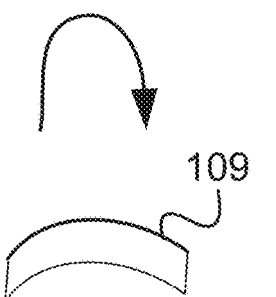
Figure 1:
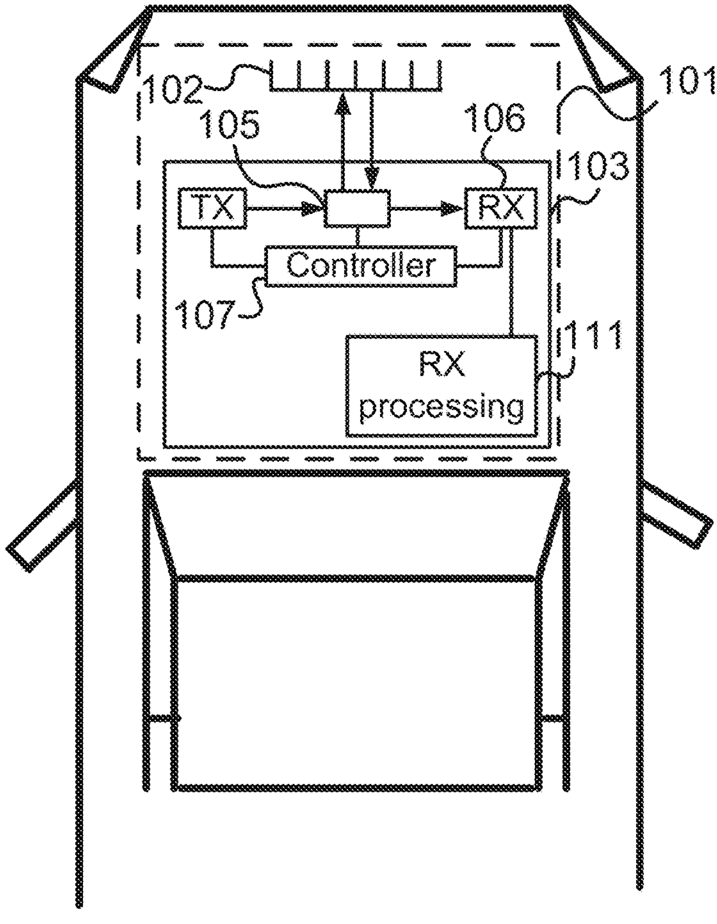

FIG. 1 shows a radar arrangement 100. The radar arrangement 100 includes a radar device (implementing a radar system) 101 that includes an antenna arrangement 102 and a radar control device 103. It should be noted that, while the radar system is in this example implemented by a radar device 101, the radar system may be also implemented by an arrangement of devices, e.g. including an electronic control unit (ECU) or a vehicle controller and/or a device (or arrangement) implementing an Advanced Driver Assistance Systems (ADAS).

The radar control device 103 includes one or more (radar) transmitters 104, a duplexer 105 (i.e. a circuit to separate transmitted signals from received signals), a (radar) receiver 106 and a controller 107. The radar arrangement may include multiple transmit antennas in form of a transmit antenna array and multiple receive antennas in form of a receive antenna array.

For the detection of an object 108, the controller 107 controls the one or more transmitters 104, the duplexer 105 and the receiver 106 as follows:

The one or more transmitters 104 transmit a transmit signal 109 via the antenna arrangement 102.

The transmit signal 109 is reflected by a target (object) 108;

The radar device 101 receives the echo 110 of the transmitted signal as receive signal.

From the received signal, the radar control device 103 (e.g. a radar signal processing circuit 111) calculates information about position and speed of the object 108.

For example, the radar device 101 may be installed in a vehicle for detection of nearby objects, in particular for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar or phase-modulated continuous wave (PMCW) radar.

Figure 2:
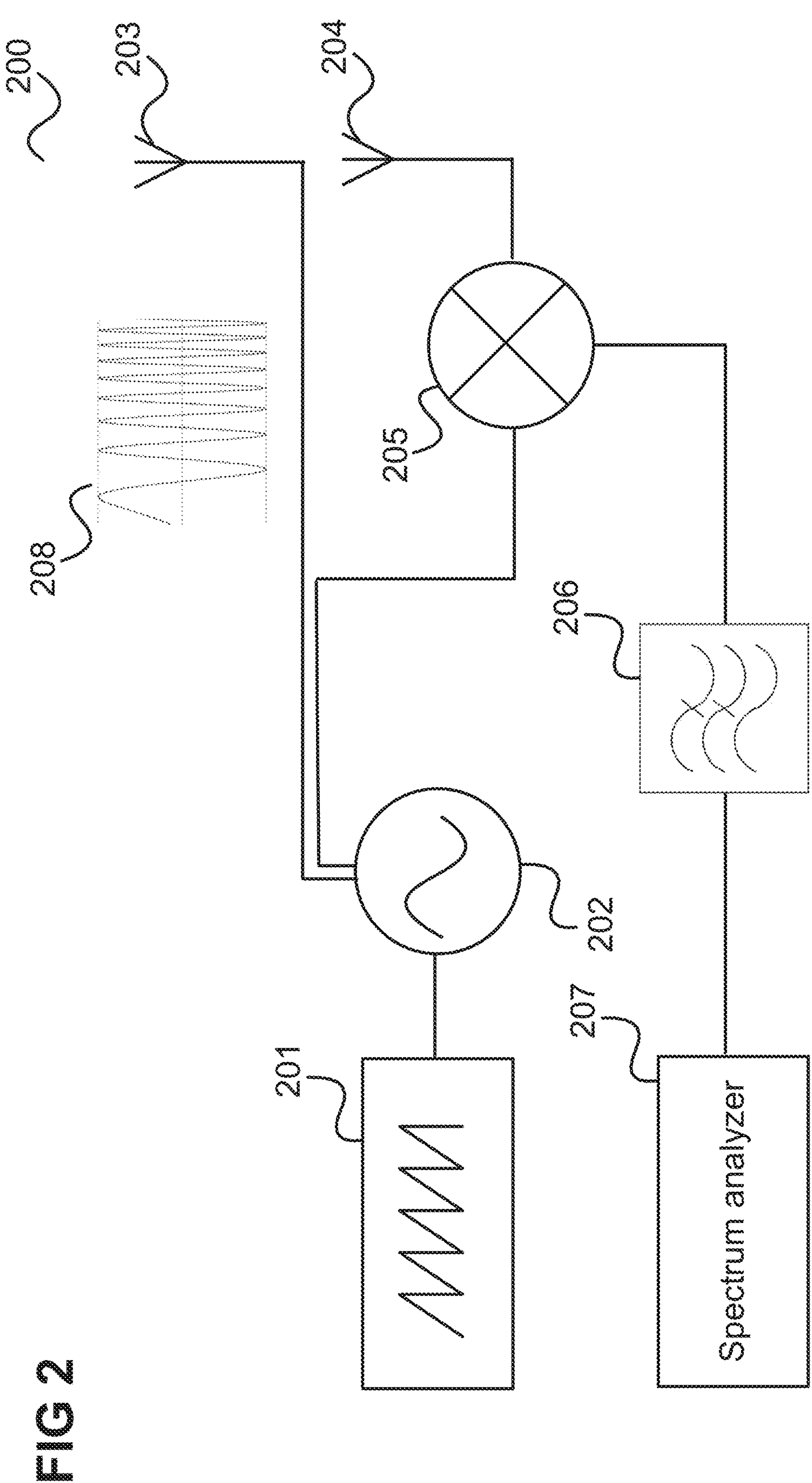
FIG. 2 illustrates an example Frequency-Modulated Continuous Wave (FMCW) radar system.

FIG. 2 illustrates an FMCW radar system 200. In an FMCW radar system, rather than sending a transmit signal with a constant frequency, the frequency of the transmit signal is periodically ramped up and reset according to a saw tooth (or alternatively a triangle) waveform 201. The saw tooth waveform 201 may for example be generated by a ramping circuit (or "ramper"). The saw tooth waveform 201 frequency-modulates an oscillator 202 and the resulting transmit signal is fed to a transmit antenna 203 (by means of a radio frequency (RF) frontend).

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps (or "ramps"), which are result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT, also denoted as range FFT) as well as velocity information (by a second stage FFT, also denoted as Doppler FFT) from the receive signal. It should be noted that the spectrum analyzer 207 works on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207. At least some of the various components of the receive path may accordingly be part of a digital or analog frontend.

To further allow determination of a direction of the object 108 with respect to the radar device 101, the antenna arrangement 102 may include a plurality of receive antennas, i.e. an array of receive antennas. The direction of an object 108 may then be determined from phase differences by which the receive antennas receive an echo from an object 108, for example by means of a third stage FFT (also denoted as angular FFT). Accordingly, a radar receiver may include a mixer 205, an analog filter 206 and an ADC for each receive antenna.

The digitized receive signals for all receive antennas are typically collected in a so-called data cube.

Figure 3:
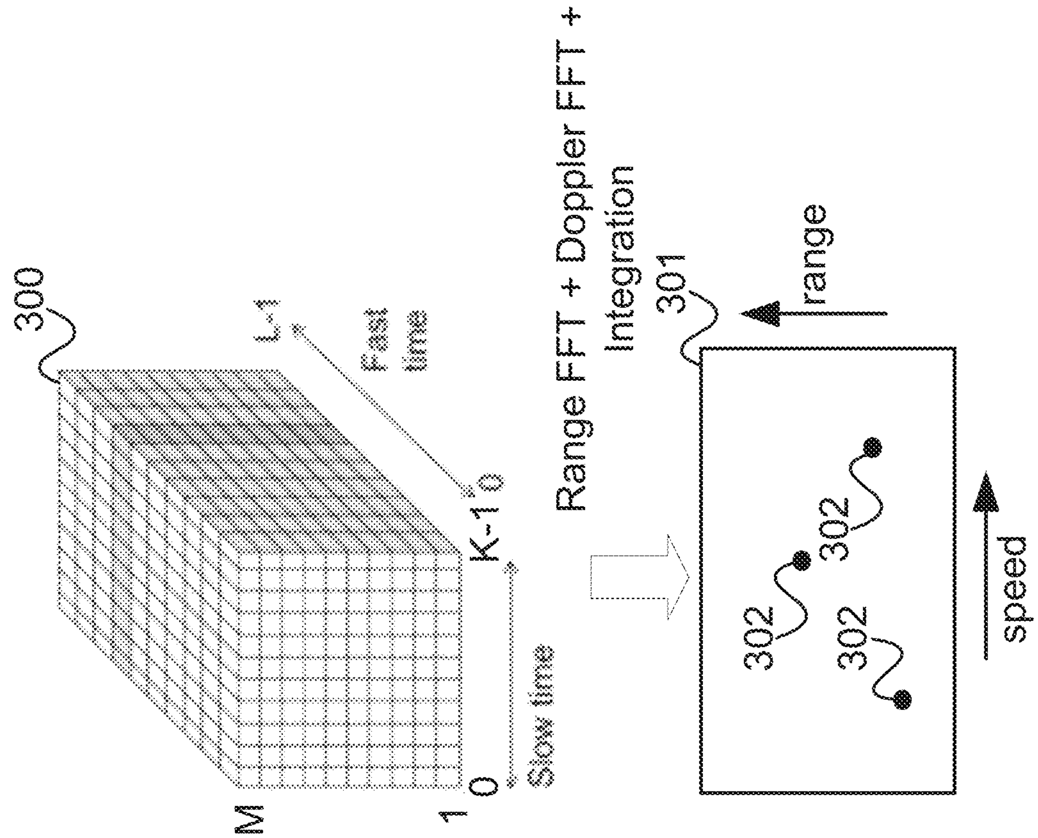
FIG. 3 illustrates an example processing of a data cube.
Figure 3:
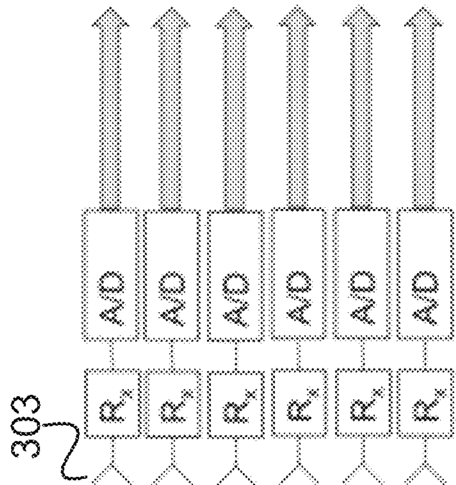

FIG. 3 illustrates the processing of a data cube 300. The data cube 300 contains digitized samples of received signals from M antennas forming a receiving antenna array 303. The digital samples are generated by analog-to-digital conversion.

For example, for each chirp (e.g., K=64 chirps), the received signal is sampled to have L samples (e.g., L=512).

The L samples collected for each chirp are processed by the first FFT stage.

The processing of the first FFT stage is performed for each chirp and antenna, so that the result of the processing of the data cube 300 by the first FFT stage is again three-dimensional and may have the size of the data cube 300, but no longer contains values for L sampling time points, but contains values for L distance bins. It should be noted that for real input signals to the first FFT stage, only the distance bins 0 to L/2 are usually useful, since the spectrum of the first FFT is mirrored at L/2 and the second half can be discarded.

The result of the processing of the data cube 300 by the first FFT stage is then processed by the second FFT stage along the chirps (for each antenna and for each range bin).

The direction of the first stage FFT is referred to as fast time, while the direction of the second stage FFT is referred to as slow time (the direction of the chirps).

The result of the second stage FFT produces a range Doppler map for each antenna, which, when aggregated across the antennas (e.g., using NCI (non-coherent integration) or CI (coherent integration) to improve the signal-tonoise ratio and have a higher detection probability), results in a range Doppler map 301. The range-Doppler map 301 includes an FFT output value for each combination of range bin and Doppler bin, so it is an array with a range index and a Doppler index.

For certain combination of range bin and Doppler bin (i.e., for certain range/Doppler bins), the range Doppler map 301 has FFT peaks 302 (i.e., peaks of the FFT output values (i.e., peak values with respect to absolute value)).

To identify FFT peaks 302, peak detection is applied to the range Doppler map 301. Among the detected peaks, targets (i.e. detected objects) may then be selected (i.e. each detected target corresponds to a peak).

In a DDM (Doppler Division Multiplexing) radar system, there are not only multiple receive antennas but also multiple transmit antennas to realize multiple transmit channels, wherein the transmit channels are realized by having successive chirps with different phase offsets (e.g. according to a BPSK (Binary Phase Shift Keying), QPSK (Quadrature PSK) or mPSK modulation). Doppler Division Multiplexing (DDM) modulation is typically preferred in automotive radar because of the following advantages over Time Division Multiplexing (TDM): Improved SNR, Improved maximum unambiguous velocity, Decoupling of Doppler angle dimensions, Compressed data.

Figure 4:
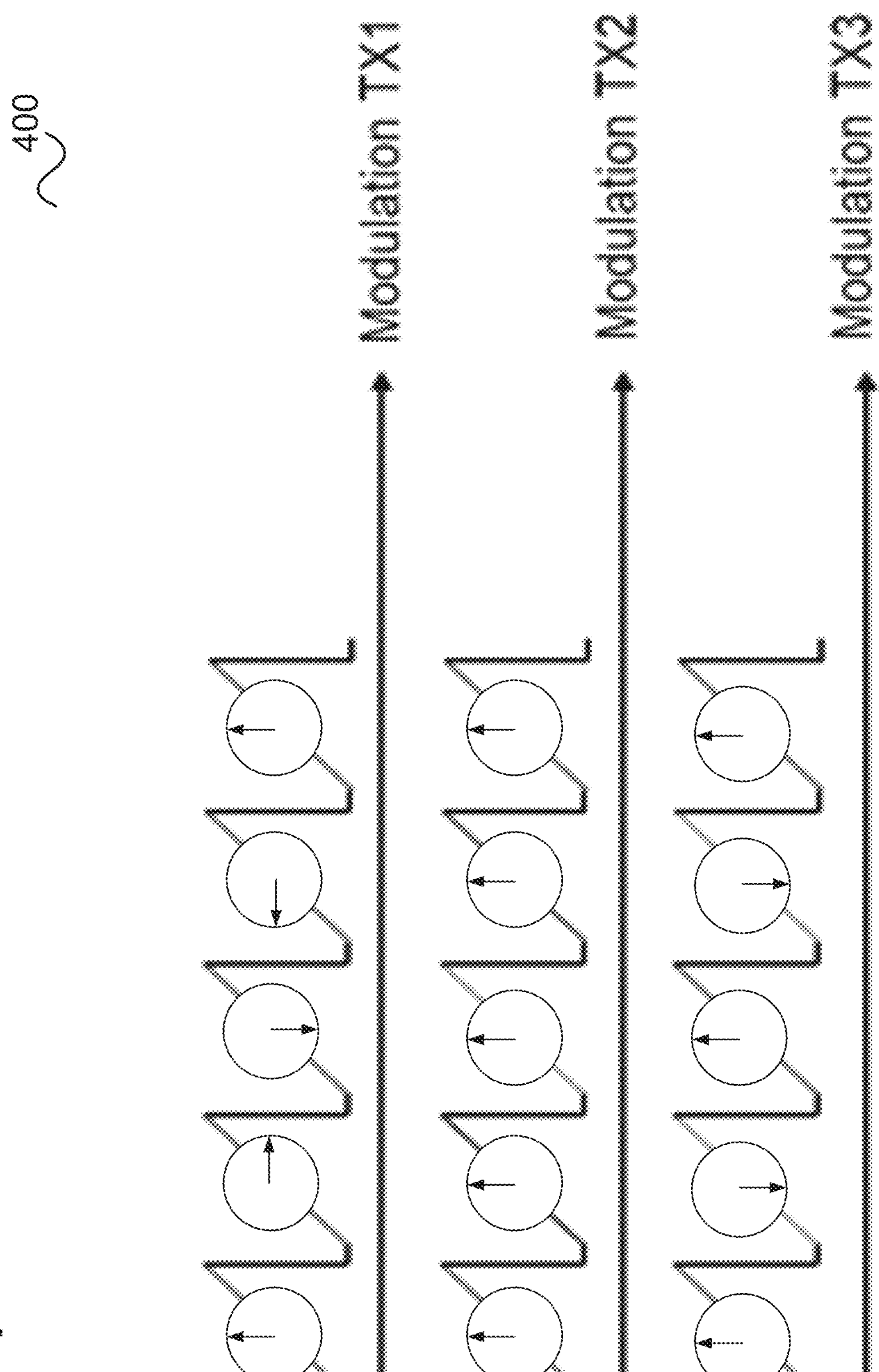
FIG. 4 shows an example for three transmit channels in a Doppler Division Multiplexing DDM radar system.

FIG. 4 shows an example for three transmit channels in a DDM radar system. In this example, successive chirps (represented here by spikes of a frequency modulation signal) of a first transmit channel (TX1) have a phase offset of 90° from each other (QPSK), successive chirps a second transmit channel (TX2) have no phase offset from each other (1PSK), and successive chirps of a third transmit channel have a phase offset of 180° from each other (BPSK).

However, due to imperfections of phase shifters, the offsets generated by a phase shifter may differ from the nominal offset on specific points of the desired constellation. For example, there may be phase errors of the chirps of the first transmitter (TX1) due to phase shifter inaccuracy: rather than having a [0° 90° 180° 270° ] constellation expected for a 90° chirp to chirp phase offset, the actual constellation could be [0° 85° 180° 273° ]. Due to DDM being sensitive to phase shifter inaccuracy this may create spurious artifacts that can be interpreted as targets and distort true target angle estimation.

Accordingly, phase shifter calibration is an important topic for automotive radar. Usually it is performed in a calibration facility at the end of the production line. However, a radar system can drift out of its calibrated state during the life cycle following unpredictable parameters. Therefore, approaches for online calibration (i.e. calibration when the radar system is used, e.g. in a vehicle) are desirable to allow for self-calibration during normal radar operation.

Figure 5:
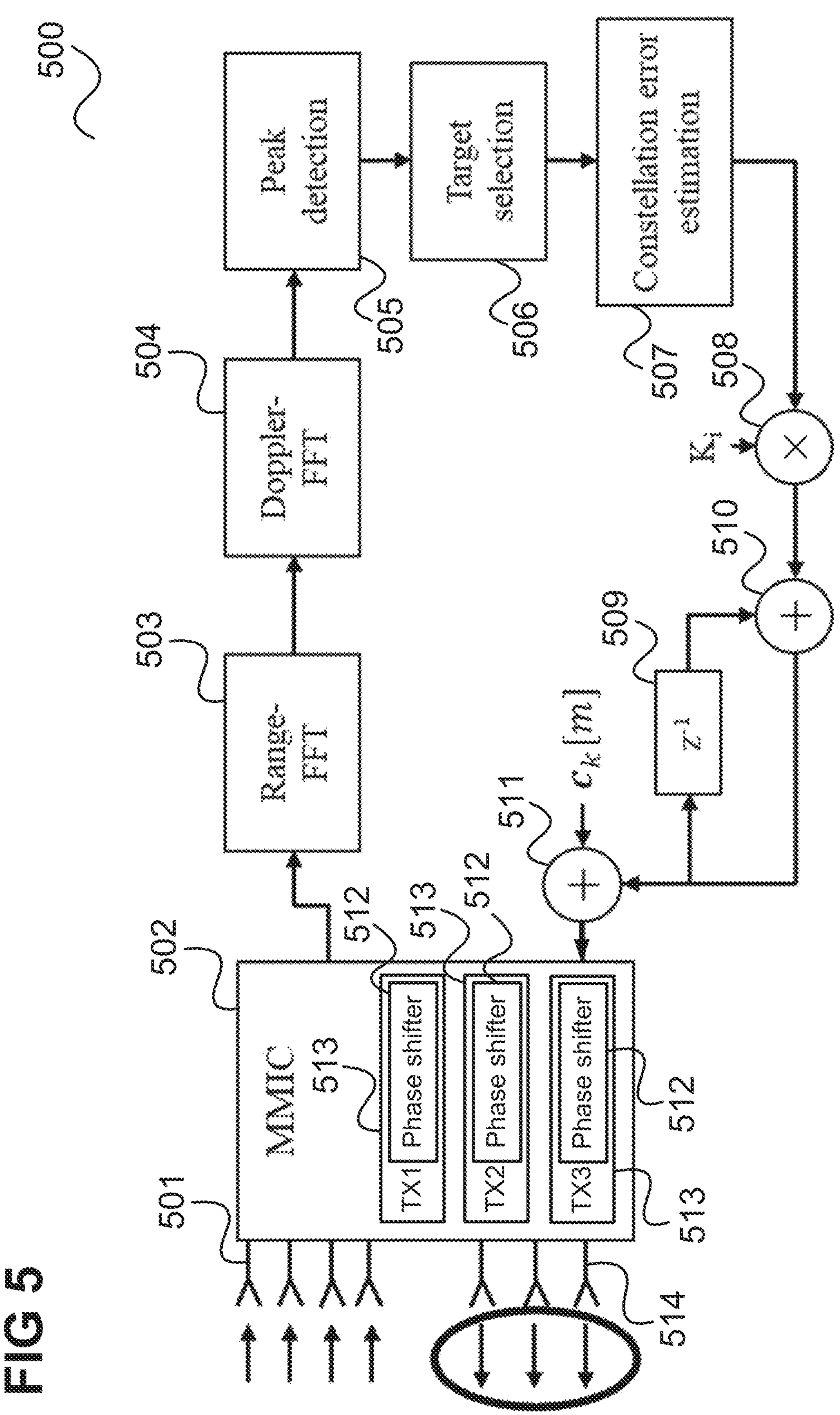
FIG. 5 illustrates an example of self-calibration in a radar system.

FIG. 5 illustrates self-calibration in a radar system 500. The signals received by a plurality of receive antennas 501 are processed by means of an MMIC (Monolithic Microwave Integrated Circuit) 502 up to analog-to-digital conversion (i.e. the generation of the digitized receive signals as explained with reference to FIG. 2).

As explained above, the digitized receive signals are then processed by a range-FFT 503, a Doppler-FFT 504, a peak detection 505.

A target selection 506 then selects a target (detected object) from the detected peaks.

The radar system 500 uses DDM. Accordingly, it comprises multiple transmit antennas 514, wherein each transmit antenna 514 realizes a respective transmit channel with a respective (associated) offset between subsequent chirps it sends out. To implement this, the MMIC 502 comprises a respective transmitter (or transmit path) 513 including a respective phase shifter 512 for each transmit antenna 514 which shifts the phase between subsequent chirps according to the phase offset that is associated with the transmit antenna 514. Specifically, the m-th chirp that is sent by the kth-antenna has an offset given by $c_k[m]$ which is the m-th point of a constellation (i.e. a set of points in the complex plane) $c_k$.

Figure 6:
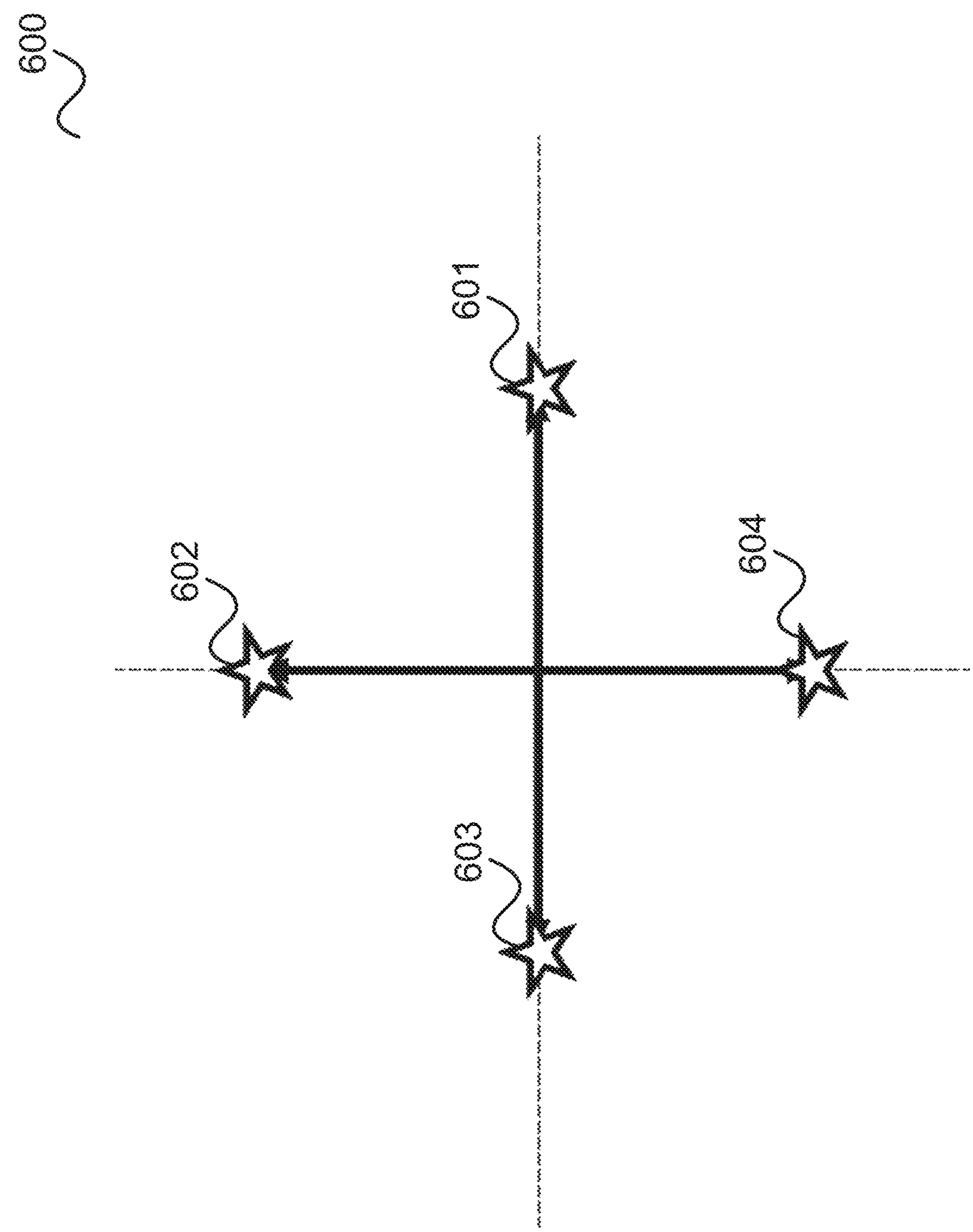
FIG. 6 illustrates an example constellation of a transmitter using QPSK (quadrature phase shift keying).

FIG. 6 illustrates the constellation 600 of the first transmitter (TX1) using QPSK. The constellation 600 includes four constellation points 601, 602, 603, 604 (in the complex plane) which have a 90° offset with respect to each other.

When only one transmitter (e.g. the first transmitter TX1) is active (i.e. in a single modulated transmission mode), its constellation can be determined by applying an inverse discrete Fourier transform (IDFT) to the values of the range/Doppler bins of the range Doppler map 301 associated with a peak in Doppler direction (in a specific order). This is also referred to as the "IDFT constellation estimation technique". The values to which the IDFT is applied is the (complex) Doppler spectrum value at the peak and the (complex) Doppler spectrum values at the positions of the spurs associated with the peak, i.e. the Doppler spectrum values at the positions in the Doppler spectrum of the spurs that are caused in case of phase errors of the transmitter (or, in other words, the Doppler spectrum values of ghost targets caused due to one or more phase errors).

Specifically, the number of values that goes into the IDFT corresponds to the number of constellation points (here four values because of QPSK) and they are equally spaced (together with the peak) in the range of velocities (i.e. the range of velocities for which there are Doppler bins, i.e. within the Doppler FFT length).

Figure 7:
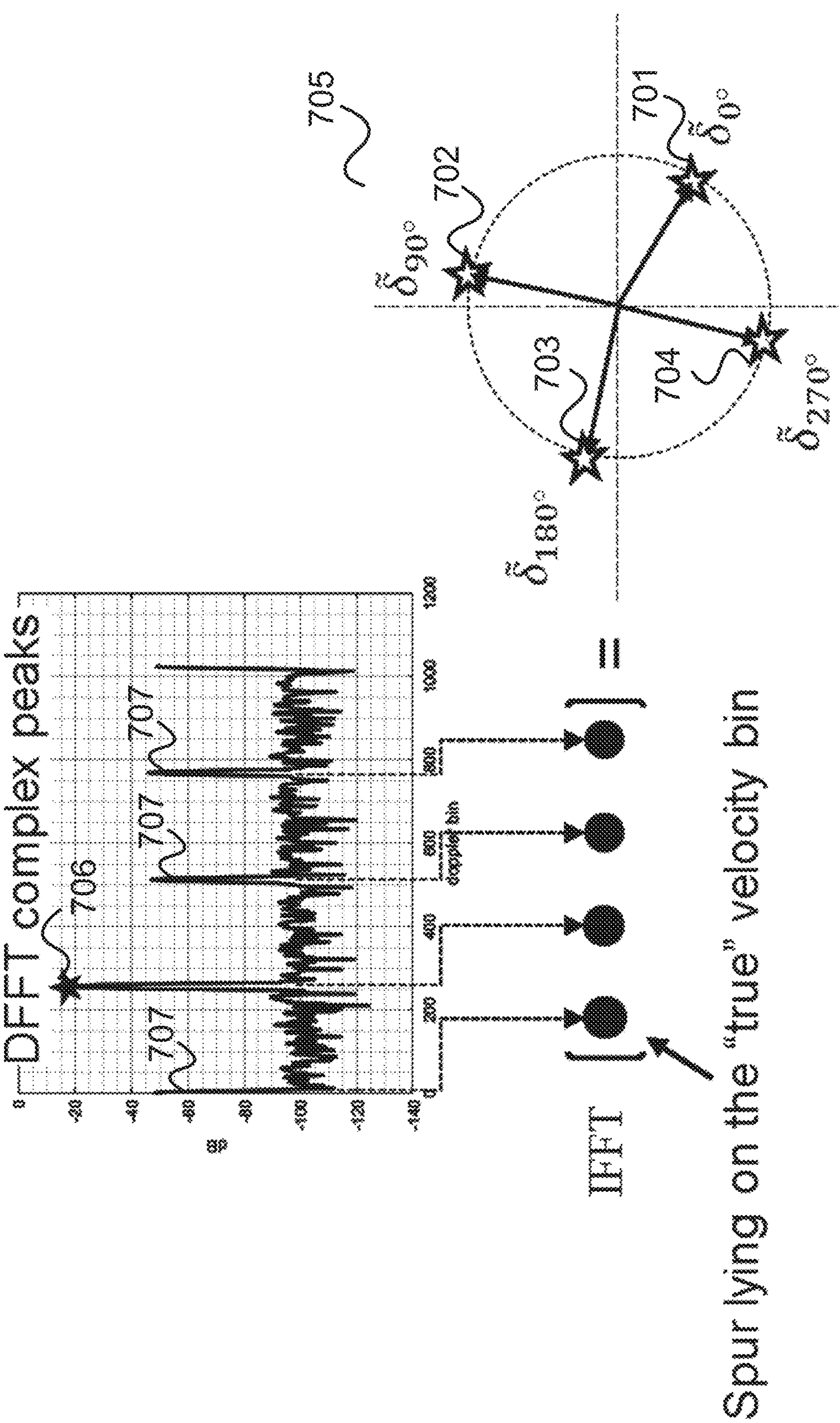
FIG. 7 illustrates an example determination of a constellation in single modulated transmission mode from Doppler Fast Fourier Transform (FFT) outputs in Doppler direction near a peak.

FIG. 7 illustrates the determination of a constellation 705 in single modulated transmission mode from Doppler FFT outputs in Doppler direction associated with a peak 706.

As can be seen, in this example, there are phase imbalances in the constellation so the estimated constellation 705 differs from the ideal constellation 600 of FIG. 6. It should be noted that the important difference is the imbalance in the branches but not the mean rotation of the full constellation, i.e. relative errors (e.g. angle between 601 and 602 compared to angle between 701 and 702) rather than absolute errors (constellation 705 compared to constellation 600).

This is reflected by values for spurs 707 associated with the peak 706, i.e. the values that go into the IDFT other than the value at the peak 706 are above noise level. These values give rise to the relative error between the determined constellation 705 and the ideal constellation 600, e.g. the difference between the angle between 601 and 602 and the angle between 701 and 702.

It should be noted that spurs associated with a peak appear at specific positions relative to the peak and depend on the order of the DDM constellation of the transmitter of interest. For instance, in FIG. 7, a QPSK constellation is used. Accordingly, the peak appears shifted in the Doppler space and three spurs (harmonics) appear on the Doppler spectrum equally spaced from a quarter of the available Doppler space relative to the peak position on the spectrum and aliased if necessary.

Spurs can be understood as spurious signals (here corresponding to Doppler spectrum values) that falsely indicate target energy thereby reducing the performance, accuracy, reliability, and/or general utility of the radar system.

So, an approach for calibration of the phase shifters 512 is to switch off all transmitters except for one, perform constellation error estimation 507 by estimating the actual constellation of the transmitter as described with reference to FIG. 7 and comparing with its supposed constellation (which gives a phase error for each constellation point), and adding, for each constellation point, a compensation value according to the estimated error by a first adder 511 to the respective constellation symbol. The compensation value may include a weight or learning rate $K_i$ (for gradual compensation) applied by a multiplier 508 as well as integration by a delay block 509 and a second adder 510 such that the compensation value does not only depend on a current error but also on past errors.

So, a possible approach is entering a special calibration mode (e.g. for a single radar frame) where only a single transmitter is enabled and estimate a compensation value (which may also be seen as pre-distortion value) for the phase shifter of this particular transmitter. During the single transmitter mode, detections are still possible. However, detection performance is degraded as the virtual array (of (active) transmit antennas and receive antenna pairs) is much smaller.

Therefore, according to various embodiments, a multi-transmitter online calibration method for the phase shifters 512 is provided, i.e. a approaches (referred to as first approach and second approach) for online calibration are provided which allow that multiple transmitters 513 stay active during the calibration and thus in particular allow maintaining angular precision during calibration.

For a better understanding of the provided approach, it is in the following explained how the constellation that is estimated as described with reference to FIG. 7 (i.e. by means of the IDFT constellation estimation technique) changes when one or more additional transmitters are active.

As explained above, in the absence of phase errors, when only one transmitter (TX1) using QPSK is active, the IDFT constellation estimation technique gives the constellation as shown in FIG. 6.

Figure 8:
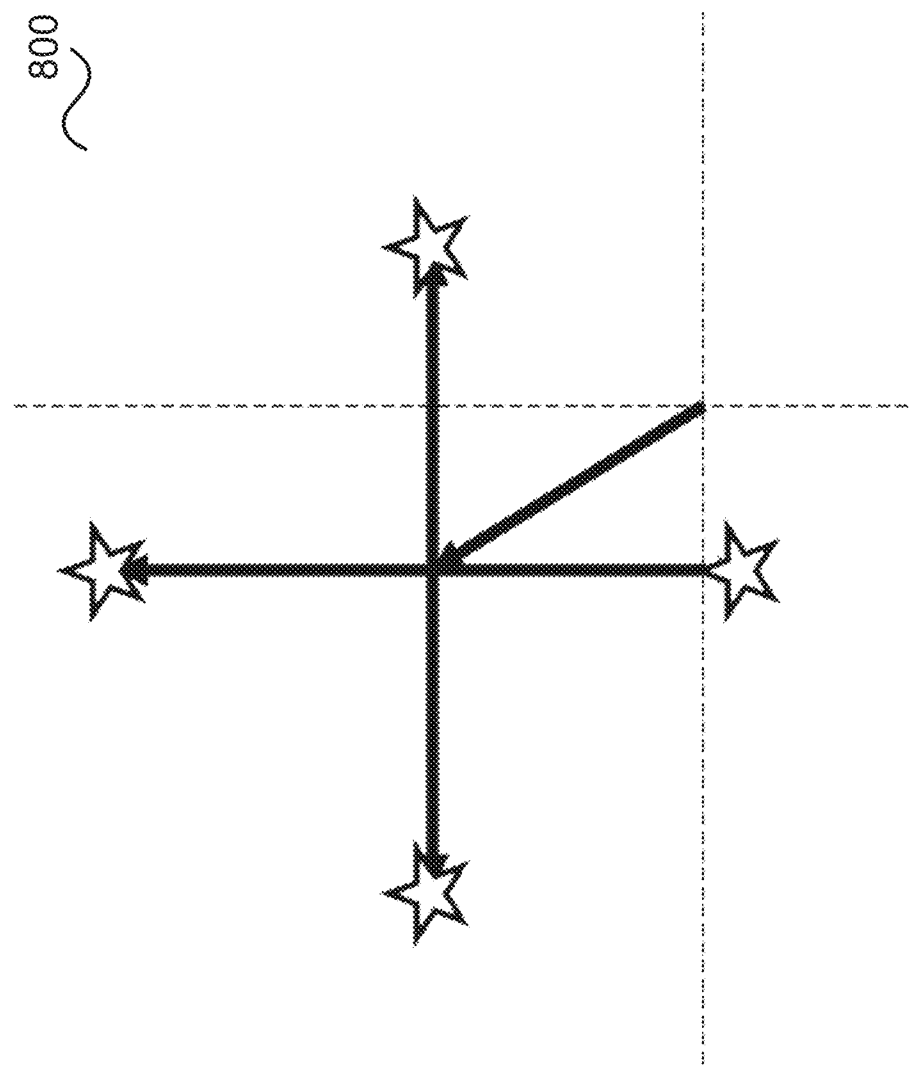
FIG. 8 shows an example super constellation output on the IQ plane resulting from the processing of the same peaks as FIG. 7 in the presence of a second active transmitter which uses a 1PSK constellation.

FIG. 8 shows the super constellation output on the IQ plane resulting from the processing of the same peaks as FIG. 7 in the presence of a second active transmitter (TX2) which uses a 1PSK constellation (i.e. non-modulated, i.e. no phase offset between subsequent chirps).

It can be seen that adding a non-modulated transmitter simply shifts the TX1 constellation in the complex plane. Now that there are two activated transmitters with a QPSK and 1PSK DDM scheme, respectively, a single target generates two peaks on the Doppler spectrum each carrying unknown complex information later used for the Direction of Arrival estimation of the target. Furthermore, if the QPSK constellation is imbalanced, each associated peak generates three spurs at known position relative to each peak associated to that Tx. One of these spurs would coincide perfectly in position with the position of the duplicated peak associated with the 1PSK Tx. This peak is a complex value (i.e. with phase and amplitude information). Therefore, the phase and complex information of the 1PSK peak distorts the estimation of the QPSK peak and spur group accordingly to in FIG. 7 as one of the 707 is now the superposition of a 707 and the 1PSK peak. The distortion is illustrated in FIG. 8 with the arrow (having the unknown amplitude and phase of the 1PSK peak) shifting the QPSK constellation to be estimated.

Figure 9:
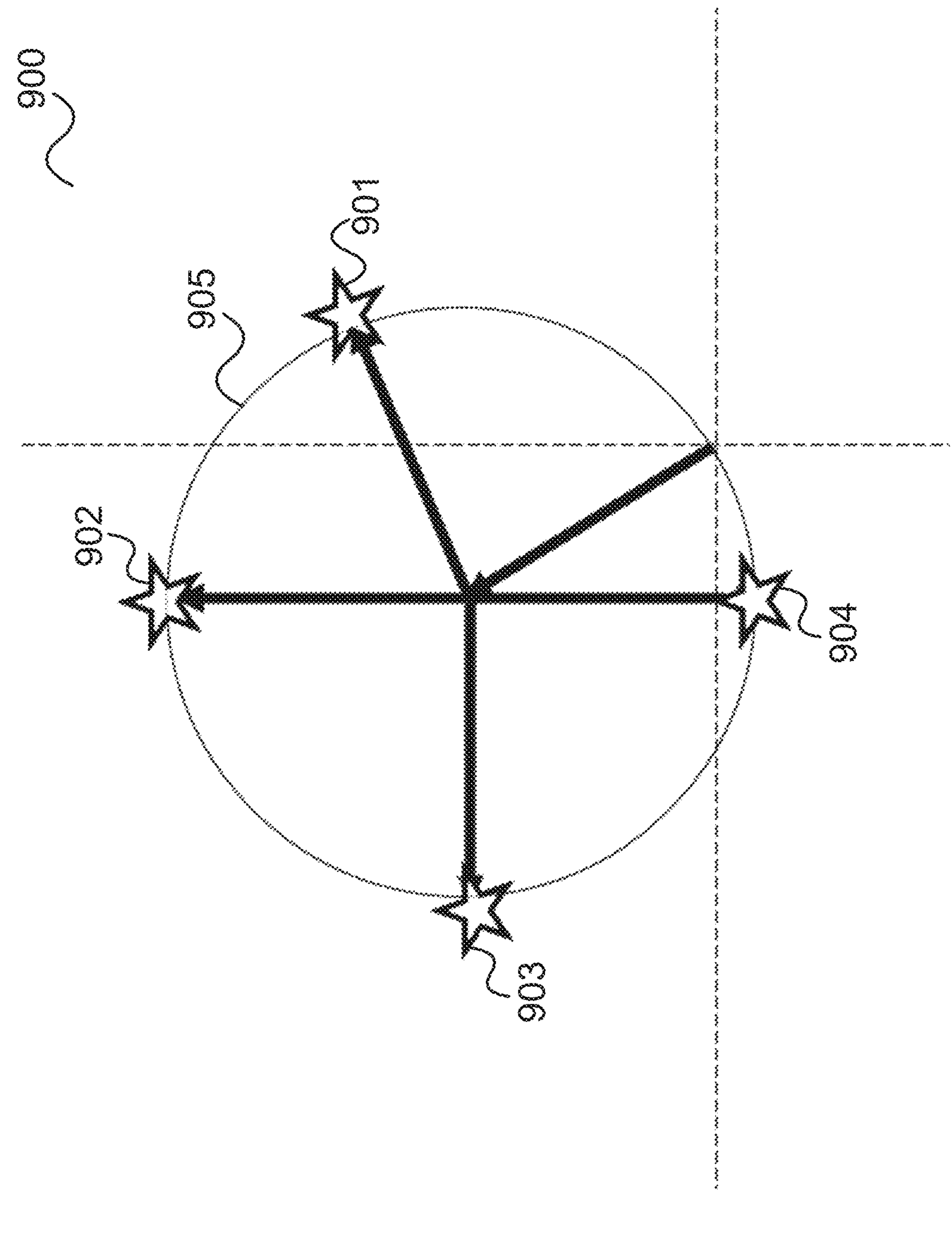
FIG. 9 shows an example constellation that the IDFT constellation estimation technique gives when a first transmitter using QPSK has a first error when in addition, a second transmitter is active which uses 1PSK.

FIG. 9 shows the constellation 900 that the IDFT constellation estimation technique gives when the first transmitter (TX1) has a first error (for the rightmost constellation point 901) when in addition, a second transmitter (TX2) is active which uses 1PSK. It can be seen that it is possible to determine a fitting circle 905 to extract the QPSK constellation points 901, 902, 903, 904 and thus estimate imbalances.

It should be noted that the orientation of the constellation observed after using the IFFT technique does not carry any information for the calibration. Only the relative errors can be estimated. The constellation given by the IFFT technique is scaled and rotated according to the peak true unknown complex value. The constellation 705 is, in that sense, a more realistic representation where the full constellation is rotated, not because of the phase shifter error but due to the unknown target complex value. So, one cannot say from the constellation 900 of FIG. 9 whether 901 is erroneous or whether 902, 903 and 904 all are equally erroneous. The only conclusion is that there is an imbalance that can be estimated and compensated. The remaining absolute error may be handled by another calibration mechanism (e.g. channel imbalance calibration).

Figure 10:
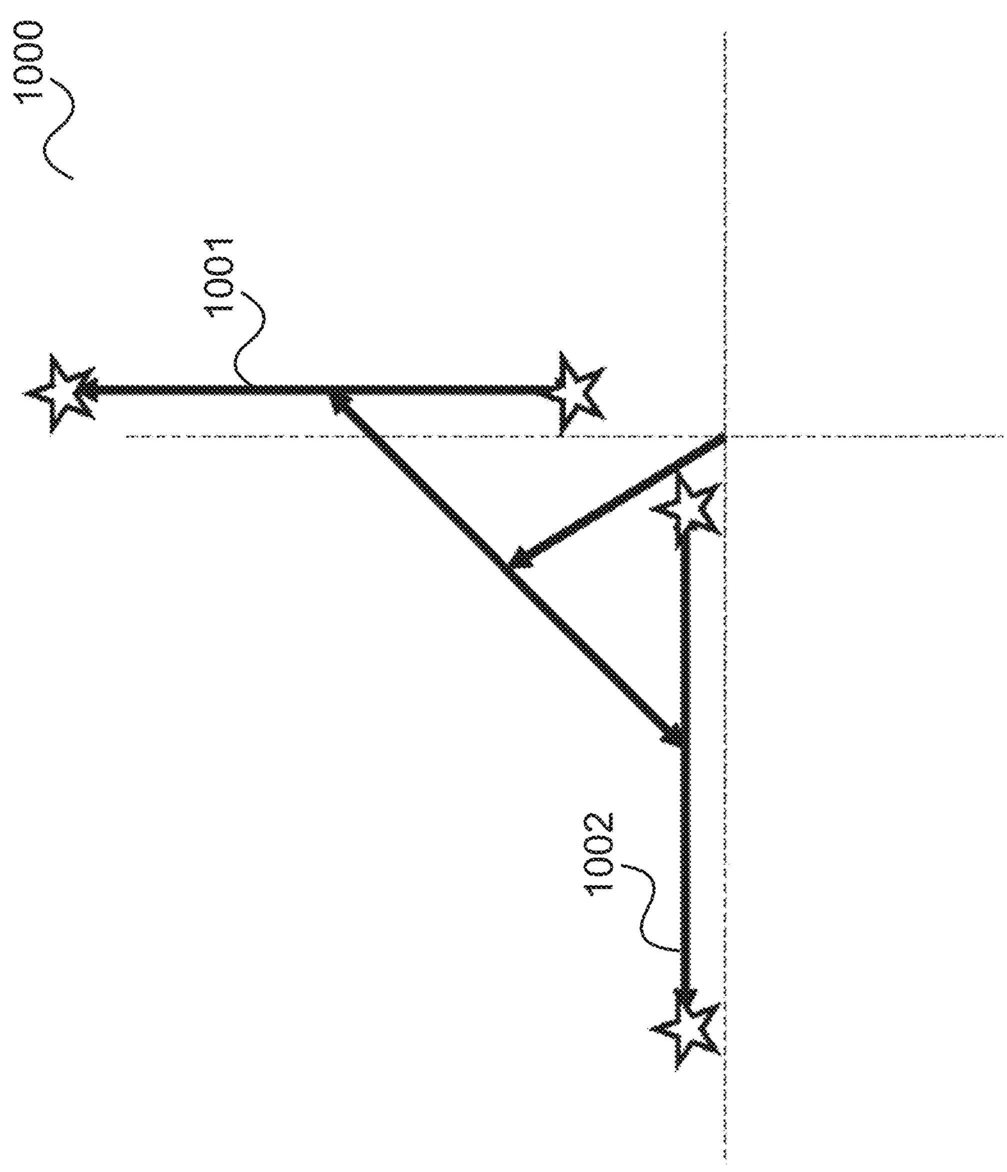
FIG. 10 shows an example constellation that the IDFT constellation estimation technique gives when in addition to the first transmitter using QPSK, the second transmitter which uses 1PSK and a third transmitter which uses BPSK (binary phase shift keying) is active.

FIG. 10 shows the constellation 1000 that the IDFT constellation estimation technique gives when in addition to the first transmitter (TX1) using QPSK (without phase error in this example), the second transmitter (TX2) which uses 1PSK and a third transmitter (TX3) which uses BPSK is active.

As explained with reference to FIG. 8, the second transmitter using 1PSK causes the constellation to be shifted. The third transmitter using BPSK causes that the QPSK constellation is now spread between the two BPSK branches 1001, 1002. This makes it impossible to determine a fitting circle to determine possible phase errors (at least if there is no perfect gain balance between the branches).

To address this issue, according to various embodiments, the first transmitter (TX1) which was up to now using 4PSK, is moved to 8PSK.

Figure 11:
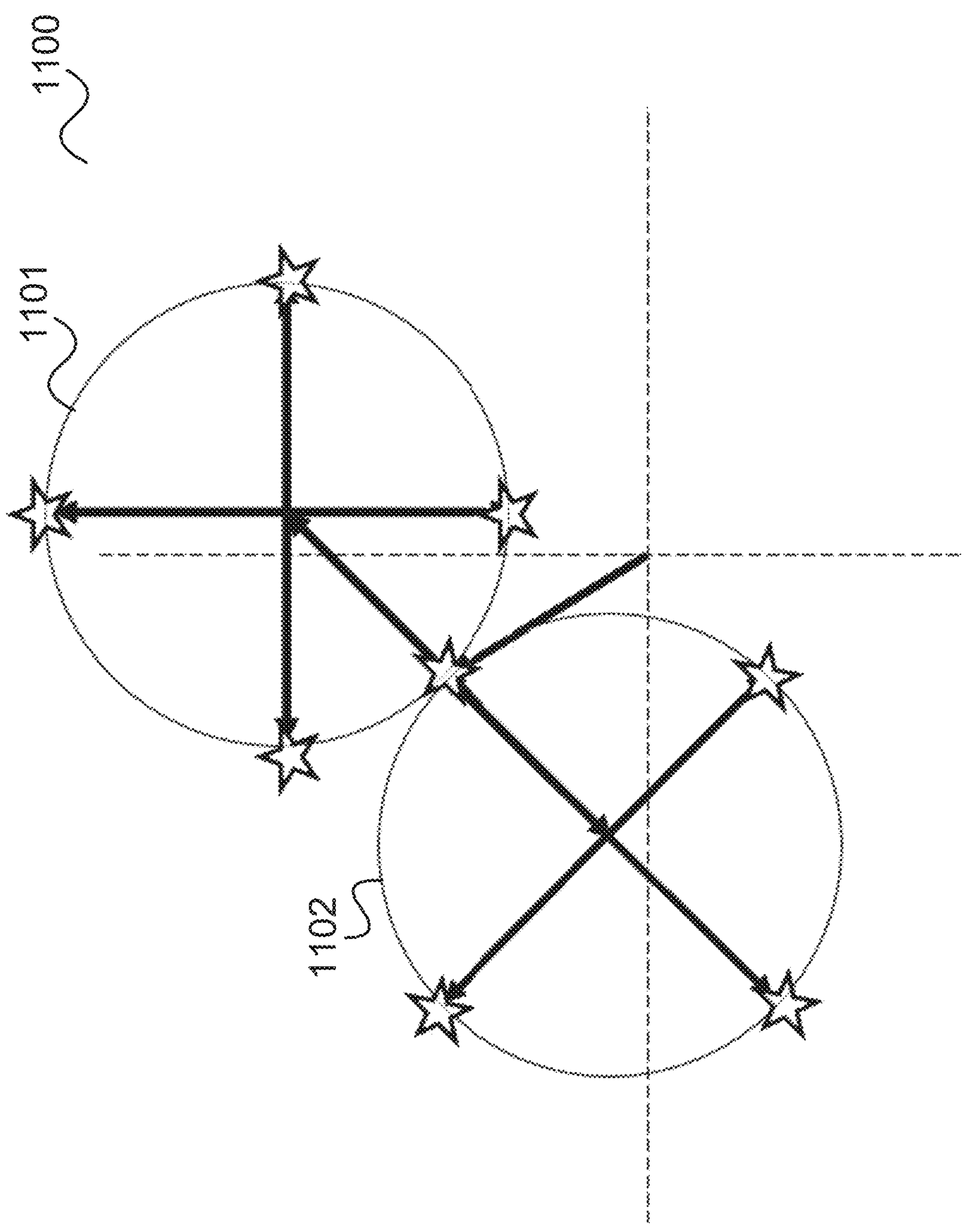
FIG. 11 shows an example constellation that the IDFT constellation estimation technique gives when the first transmitter uses 8PSK instead of QPSK.

FIG. 11 shows the constellation 1100 that the IDFT constellation estimation technique gives when the first transmitter (TX1) uses 8PSK instead of QPSK.

Now, the super constellation has eight points and it can be seen that now it is again possible to determine (now two) fitting circles 1101, 1002 for determining possible phase errors (it should be noted that the 8PSK constellation is the superposition of the points on the two fitting circles 1101, 1102).

Figure 12:
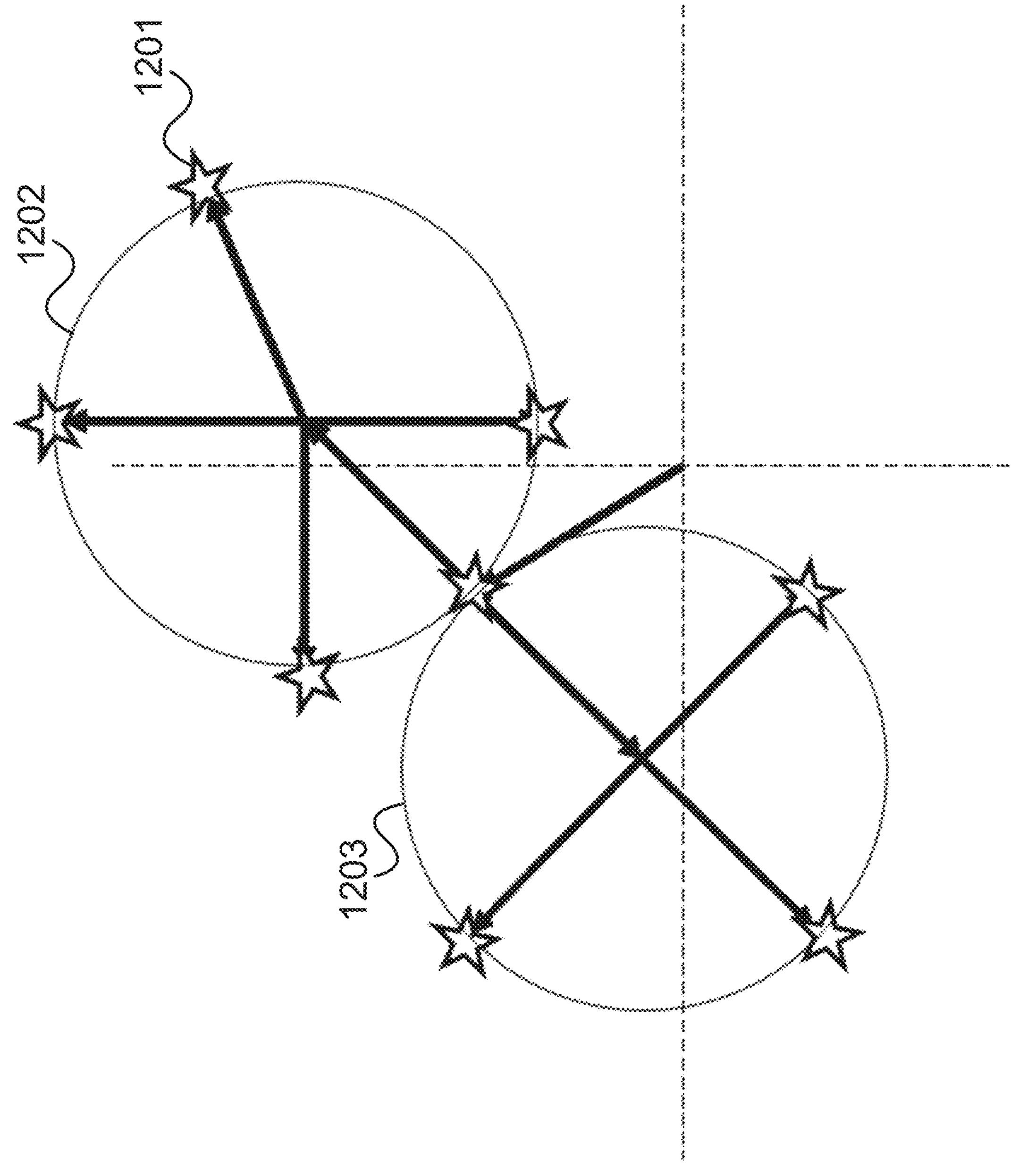
FIG. 12 illustrates an example scenario of FIG. 11 but with a phase error in a constellation point of the first transmitter.

FIG. 12 illustrates the scenario of FIG. 11 but with a phase error in a constellation point 1201 of the first transmitter.

Since the fitting circles 1202, 1203 can unambiguously be estimated it is possible to estimate the phase error of the constellation point 1201: it is given by the angle of the shift of the constellation point 1201 along the fitting circle 1202 on which it is located. So, an imbalance on the 8PSK constellation can be detected.

Fitting the circles 1202, 1203 may for example comprise determining their centers and then shifting all the constellation points according to a shift on the circles on which they are respectively located to the origin. Then, any phase error estimation approach may be applied to the shifted constellation points to determine phase errors.

Figure 13:
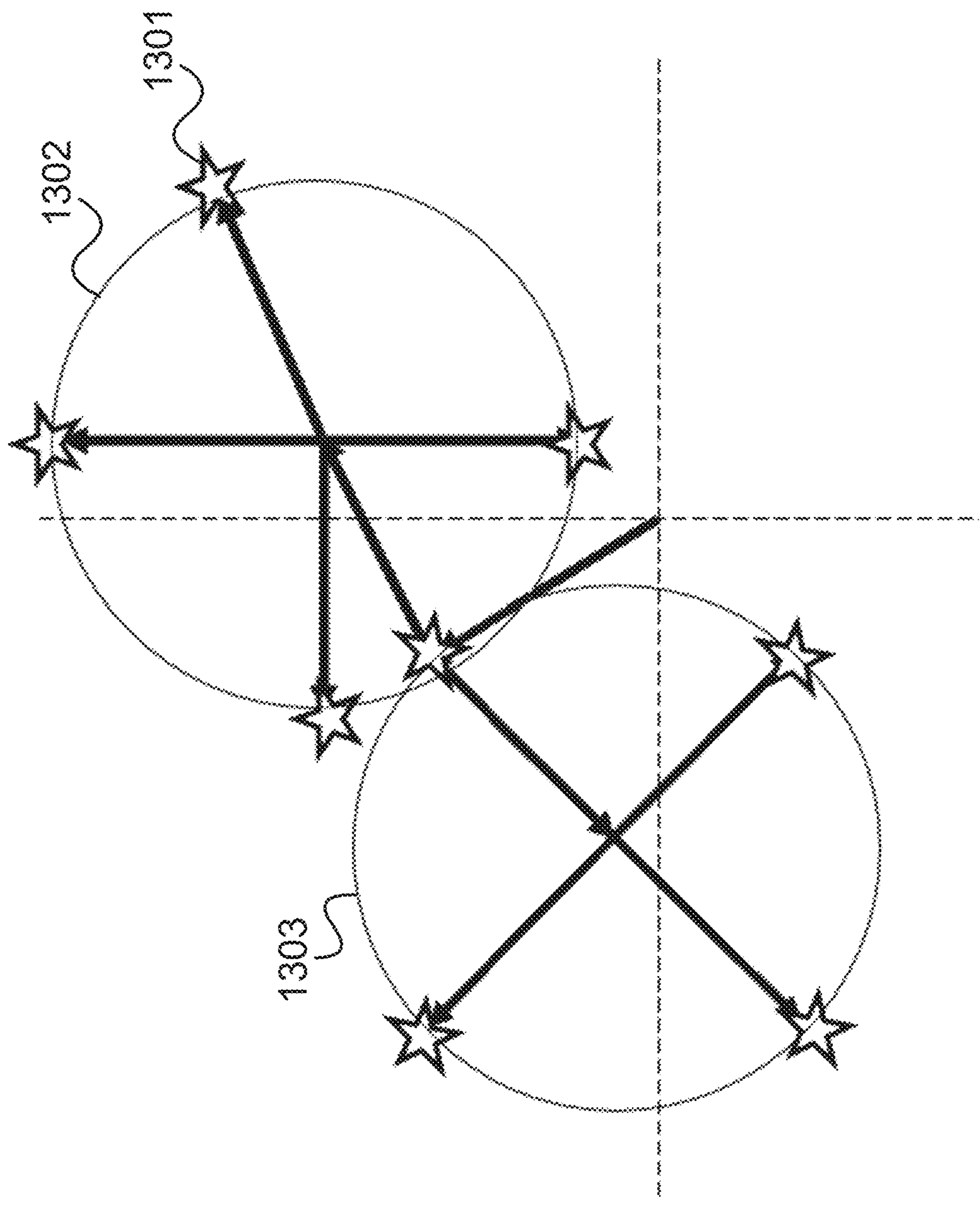
FIG. 13 illustrates an example scenario of FIG. 11 but with, in addition, a phase error in a constellation point of the second transmitter.

FIG. 13 illustrates the scenario of FIG. 11 but with, in addition, a phase error in a constellation point of the second transmitter (which uses BPSK).

As can be seen, an error on the BPSK constellation simply translates the relative position of the two fitting circles 1302, 1303. The 8PSK imbalance estimation (here the error of the constellation point 1301) is not impacted.

So, according to a first approach according to various embodiments, the transmitters are subsequently calibrated (e.g. one per radar frame) by evaluating the highest PSK order (8PSK in the above examples) in a frame, while the other transmitters use a PSK order which divides this highest PSK order (BPSK in the above examples). This means that for calibrating a transmitter in a respective frame, it needs to be the transmitter using the DDM pattern with the highest PSK order. For this, the DDM pattern is switched to a PSK order for the period in which the transmitter is calibrated (i.e. for example a radar frame) to a suitable DDM pattern.

For a DDM pattern $PSK_{TXi}$ for a transmitter TXi that is calibrated to be suitable for the first approach it is necessary that the DDM pattern includes all constellation points $PSK_{TXj}$ of the other transmitters TXj (which are kept in operation), i.e. that $$PSK_{TXj} \subset PSK_{TXi} \tag{1}$$

for all TXj with i≠j which are in operation during the calibration of transmitter TXi.

For example, 4PSK ⊂ 8PSK but 4PSK ⊄ 5PSK.

Further, for the TXi's DDM pattern to be suitable for the first approach, it needs to be fulfilled that $$\frac{PSK_{TXi}}{\Pi_{j=1, i \neq j}^{NTX} PKK_{TXj}} > 2 \tag{2}$$

where NTX is the number of transmitters. For example, in the example of FIG. 4, this formula gives 4/1*2=2 which is not greater than two and thus QPSK for the first transmitter is not sufficient. In contrast, in the example of FIG. 11 this formula gives 8/1*2=4 which is greater than two and thus 8PSK for the first transmitter is sufficient.

For a given number of DDM modulated transmitters, it is possible to estimate the constellation of the one using the PSK with the highest order when these formulas are fulfilled since fitting circles can unambiguously be determined.

For the above example of three transmitters (TX1, TX2 and TX3), calibration may be done as follows Calibrate TX1: switch TX1 to 8PSK, keep TX2 at 1PSK and TX3 at BPSK Calibrate TX2: switch TX2 to 8PSK, switch TX1 to 1PSK and keep TX3 at BPSK Calibrate TX3: switch TX3 to 8PSK, TX1 to 1PSK and TX2 at BPSK As can be seen, for calibrating a transmitter, the order of the DDM pattern of another transmitter may also be reduced such that the above two formulas are fulfilled (see e.g. the second and third case above: TX1 is set to 1PSK (i.e. it is associated with a DDM pattern with reduced order) to fulfill the above two formulas for testing TX2 and TX3.

Calibration means estimating the phase errors of constellation points of the respective transmitter and compensating estimated phase errors, e.g. as described with reference to FIG. 5 but, according to various embodiments, without the need to switch off other transmitters when calibrating a transmitter.

Figure 14:
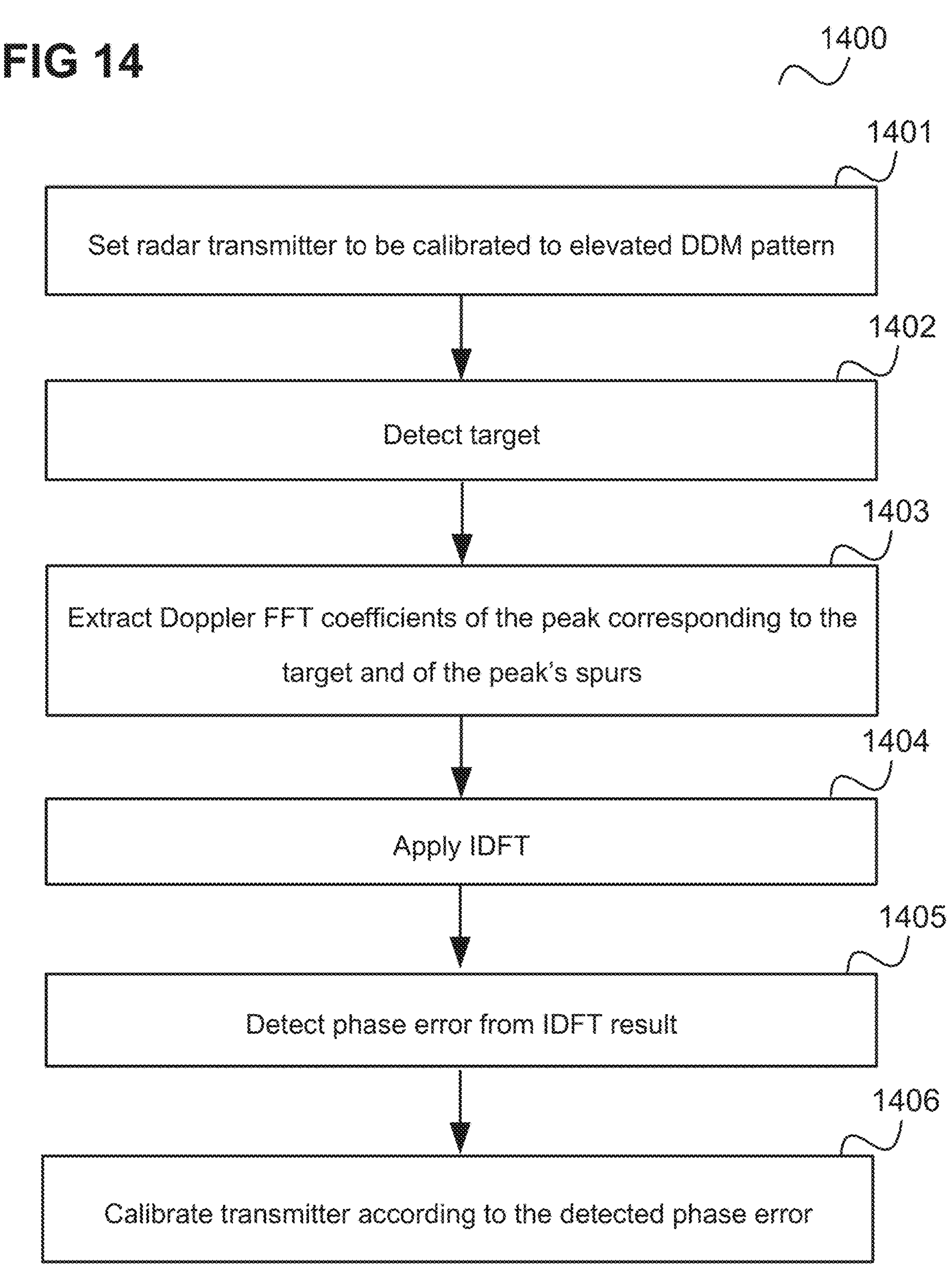
FIG. 14 shows a flow diagram illustrating an example method for calibrating a transmitter of a radar system according to an embodiment.

In summary, according to various embodiments, a method is provided as illustrated in FIG. 14 (following the first approach).

FIG. 14 shows a flow diagram illustrating a method for calibrating a transmitter of a radar system according to an embodiment, wherein the radar system comprises a plurality of transmitters.

In 1401, a radar transmitter to be calibrated among the plurality of radar transmitters is set to an elevated Doppler Division Multiplexing pattern and each of the other transmitters of the plurality of transmitters is associated with a respective Doppler Division Multiplexing pattern such that it holds that the order of the Doppler Division Multiplexing pattern divided by the product of the orders of the Doppler Division Multiplexing patterns associated with the other transmitters of the plurality of transmitters is greater than two (see the expression (2) above) and the constellation points of the Doppler Division Multiplexing patterns associated with the other transmitters of the plurality of transmitters are included in the elevated Doppler Division Multiplexing pattern (see the expression (1) above).

In 1402, a target is detected by performing radar detection with the plurality of transmitters, wherein the transmitter to be calibrated is operated with the elevated Doppler Division Multiplexing pattern and each of the other transmitters of plurality of transmitters is operated with its associated Doppler Division Multiplexing pattern.

In 1403, Doppler Fourier transform coefficients for a Doppler spectrum peak corresponding to the target and for spurs associated with the peak are extracted.

In 1404, an inverse discrete Fourier transform is applied to the extracted Doppler Fourier transform coefficients.

In 1405, a phase error of the transmitter to be calibrated is determined using a result of the inverse discrete Fourier transform.

In 1406, the transmitter to be calibrated is calibrated according to the detected phase error.

According to various embodiments, in other words, a transmitter for which phase shifter errors (e.g. imbalance) should be estimated and which should be calibrated (i.e. whose phase errors should be compensated) is switched to a particular DDM pattern (i.e. DDM constellation) which makes it possible to estimate the phase shifter errors of the transmitter with (possibly all) other transmitters being enabled. This may be done sequentially for all transmitters to be calibrated, thus allowing calibration of all transmitters without losing the detection capabilities during calibration. This allows maintaining optimal sensitivity and accuracy of a radar system during its life cycle without mid-life (costly) offline re-calibration. It may further be used to relax the End of Line (EoL) calibration effort (before deployment of the radar system).

If multiple targets are detected, a (e.g. the most) prominent target is selected as "the detected target" (i.e. a target with a clear peak etc.). It should be noted that detecting a target typically involves solving ambiguity (according to a usual detection approach for a DDM radar system).

According to various embodiments, a radar device (or radar system), like for example illustrated in FIG. 1 (but not necessarily arranged in a vehicle) is provided which is configured to perform the method of FIG. 14.

Figure 15:
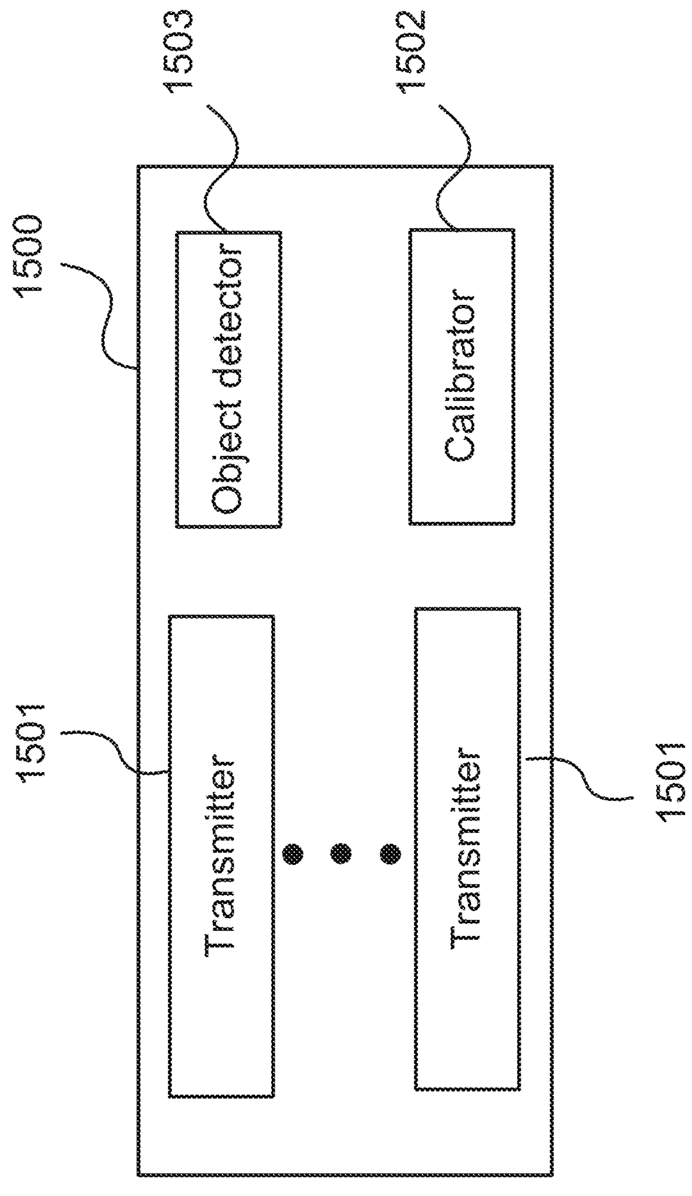
FIG. 15 shows an example radar system according to an embodiment.

FIG. 15 shows a radar system 1500 according to an embodiment. The radar system 1500 comprises a plurality of transmitters 1501.

Further, the radar system 1500 comprises a transmitter calibrator 1502 configured to set a radar transmitter to be calibrated among the plurality of radar transmitters to an elevated Doppler Division Multiplexing pattern and to associate each of the other transmitters of the plurality of transmitters with a respective Doppler Division Multiplexing pattern such that it holds that

- the order of the Doppler Division Multiplexing pattern divided by the product of the orders of the Doppler Division Multiplexing patterns associated with the other transmitters of the plurality of transmitters is greater than two and
- the constellation points of the Doppler Division Multiplexing patterns associated with the other transmitters of the plurality of transmitters are included in the elevated Doppler Division Multiplexing pattern.

The radar system 1500 further comprises an object detector 1503 configured to detect a target by performing radar detection with the plurality of transmitters, wherein the transmitter to be calibrated is operated with the elevated Doppler Division Multiplexing pattern and each of the other transmitters of plurality of transmitters is operated with its associated Doppler Division Multiplexing pattern.

The transmitter calibrator 1502 is configured to extract Doppler Fourier transform coefficients for a Doppler spectrum peak corresponding to the target and for spurs associated with the peak, apply an inverse discrete Fourier transform to the extracted Doppler Fourier transform coefficients, detect a phase error of the transmitter to be calibrated using a result of the inverse discrete Fourier transform and calibrate the transmitter to be calibrated according to the detected phase error.

As explained, in the first approach described above (which corresponds to the approach of FIGS. 14 and 15) the transmitter that is calibrated is set to a PSK order which is divisible by the PSK orders to which the other transmitters are set (and such that expressions (1) and (2) are fulfilled). This allows all transmitters to stay active during calibration but this (first) approach is difficult to scale: it gets difficult to fulfill expression (2) when the number of transmitters gets high (e.g. four or more). This scalability issue can be seen to be caused by the assumption that only power-of-two PSK orders for the constellations of the transmitters are permitted.

Therefore, according to another embodiment, a second approach is used where one or more non-power-of-two PSK orders are used for calibration. Specifically, the second approach can be seen to be based on the fact that by using PSK orders which have at least partially different prime factors for the individual transmitter's DDM constellation sufficient information of a particular phase shifter can be extracted (for one or more unknown targets) for error estimation and calibration. This allows maintaining full angular precision during calibration.

The above requirements according to equation (1) and equation (2) are then replaced by the requirement $$\frac{PSK_{TXi}}{\Pi_{j=1,i\neq j}^{NTX} gcd(PSK_{TXi}, PSK_{TXj})} > 2 \tag{3}$$

where gcd(·) refers to the greatest common divisor.

So, for example in the example above (see FIG. 4) with, in normal operation, TX1 using QPSK TX2 using 1PSK and TX3 using BPSK instead of, according to the first approach, TX1 is to 8PSK, TX2 is kept at 1PSK and TX3 is kept at BPSK (see the example above), according to the second approach TX1 is kept at 4PSK, TX2 is kept at 1PSK and TX3 is set to 3PSK.

So, the transmitter under calibration (TX1 in the present example) can be kept at its constellation (and thus not have to be set to a very high PSK order which causes the scalability issue when a lot of transmitters are present and angular precision should be maintained). It should further be noted that compared with the first approach, the second approach allows calibration with less spurs.

Figure 16:
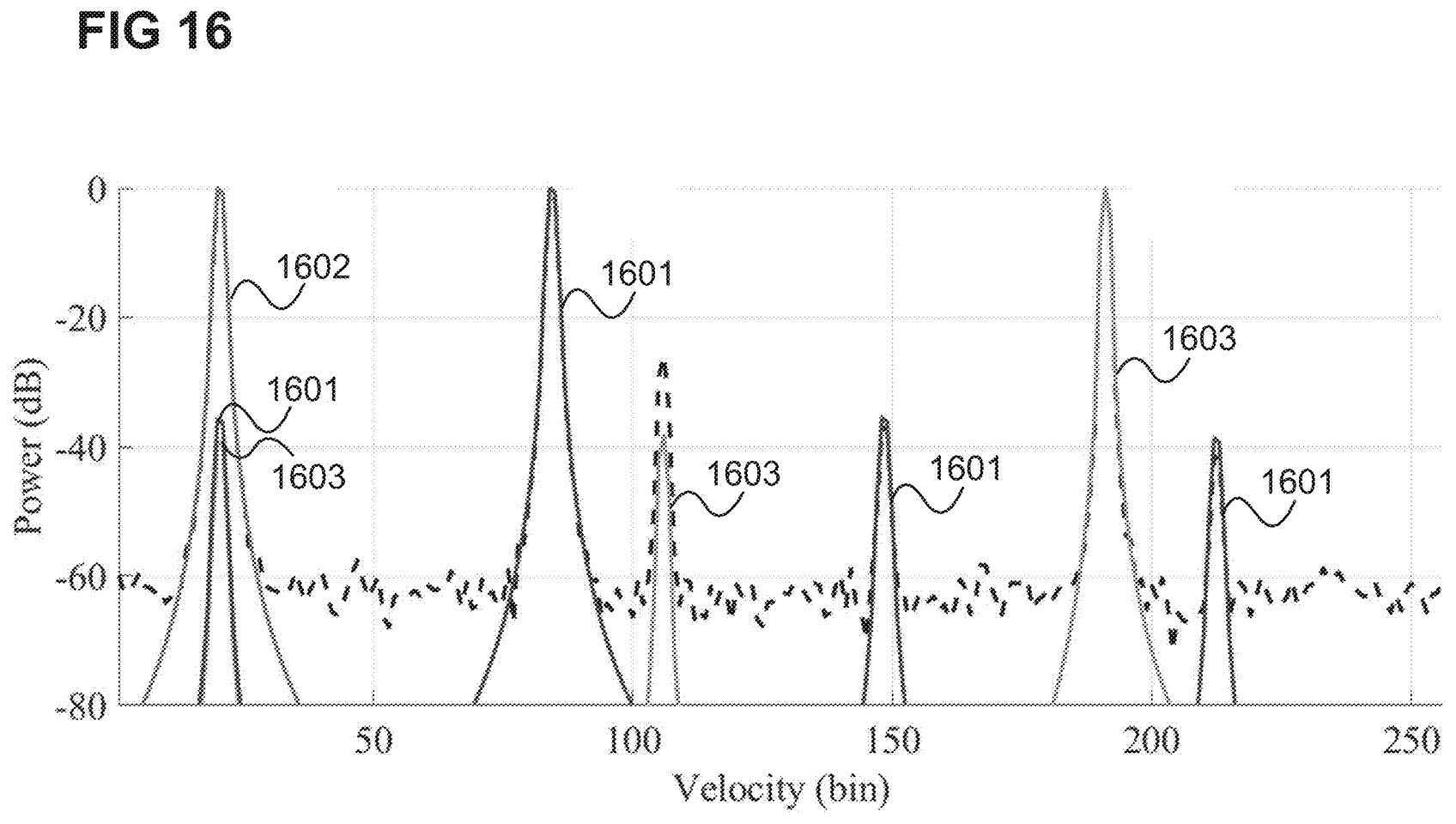

FIG. 16 illustrates the Doppler FFT outputs (absolute values) in case of a calibration using the second approach. The values shown are exemplary values for the example given above:

TX1 is kept at 4PSK, TX2 is kept at 1PSK and TX3 is set to 3PSK

Four first peaks 1601 belong to TX1 (when operated alone using QPSK), a single second peak 1602 belongs to TX2 (when operated alone using 1PSK) and three third peaks 1603 (the leftmost of them mostly coinciding with the leftmost of the first peaks) belong to TX3 (when operated alone using 3PSK). The dashed curve indicates the resulting Doppler spectrum when all three transmitters are operated for calibration of TX1.

By using multiple of such DDM codes (i.e. PSK orders, i.e. Doppler Division Multiplexing patterns (transmitter constellations)) with at least partly different prime factors, each transmitter phase shifter information can be sequentially isolated from the influence of the other transmitters to perform the transmitter phase shifter error estimation. The error estimation can be used in an iterative loop to predistort the phase shifter input (i.e. configuration or setting of the phase shift it applies).

According to the second approach, as explained above, the transmitter constellations are not included in one another (at least not for all pairs of transmitters, like TX1 and TX3 in the example above).

Figure 17:
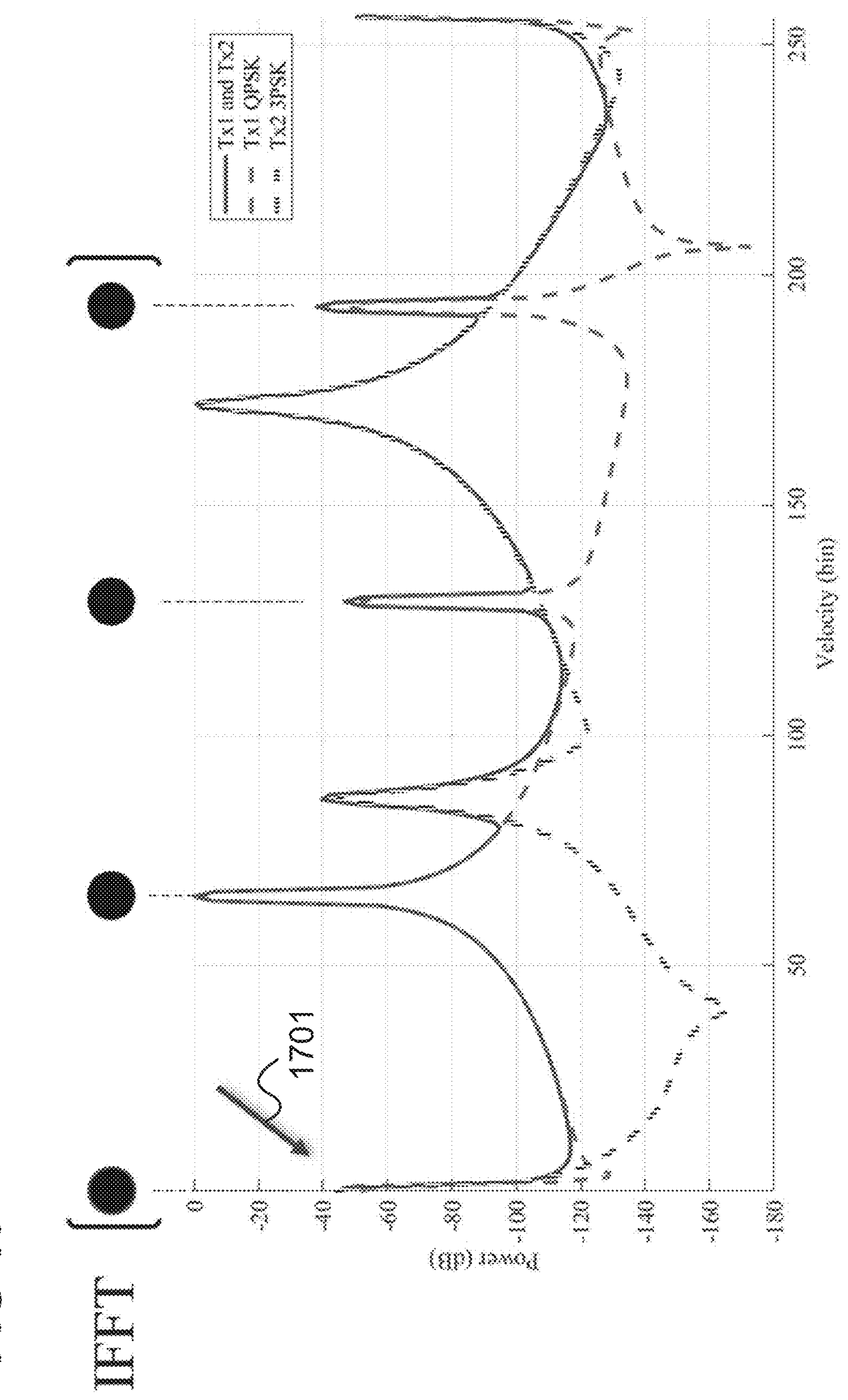
FIG. 17 illustrates an example with two transmitters.

FIG. 17 illustrates an example with two transmitters TX1 and TX2 where TX1 uses QPSK and TX2 uses 3PSK.

In that case, TX1 has three spurs and TX2 would have two, but only the spurs corresponding to the true velocity (marked by arrow 1701) superpose. Therefore, the IFFT technique on the QPSK peak and spur group would only be distorted on a single location (corresponding to arrow 1701). This offers sufficient information for the QPSK error estimation.

It should be noted that the first approach and the second approach may be combined in the sense that the transmitter to be calibrated (first transmitter) is set to a DDM pattern including those of a first subset of the other (i.e. second) transmitters and setting a second subset of the other (i.e. second) transmitters to DDM patterns which have orders which have a (non-trivial) divisor co-prime to that of the DDM pattern of the transmitter to be calibrated. The first subset may include one or more transmitters and/or the second subset may include one or more transmitters.

For example, in case of four transmitters TX1 to TX4 (e.g. TX1 to TX3 as in the above example plus a fourth transmitter TX4):

TX1 (which is to be calibrated) is set to 8PSK

TX2 is set to (or kept at) 1PSK

TX3 is set to (or kept at) 2PSK

TX4 is set to 3PSK.

In this example, the DDM patterns of TX2 and TX3 are included in the DDM pattern of TX1 and they have only prime factors (namely 2), that is also a prime factor of the DDM pattern of TX1, while the DDM pattern of TX4 has a divisor (and thus a prime factor) which is co-prime to the DDM pattern of TX1 (namely 3).

Figure 18:
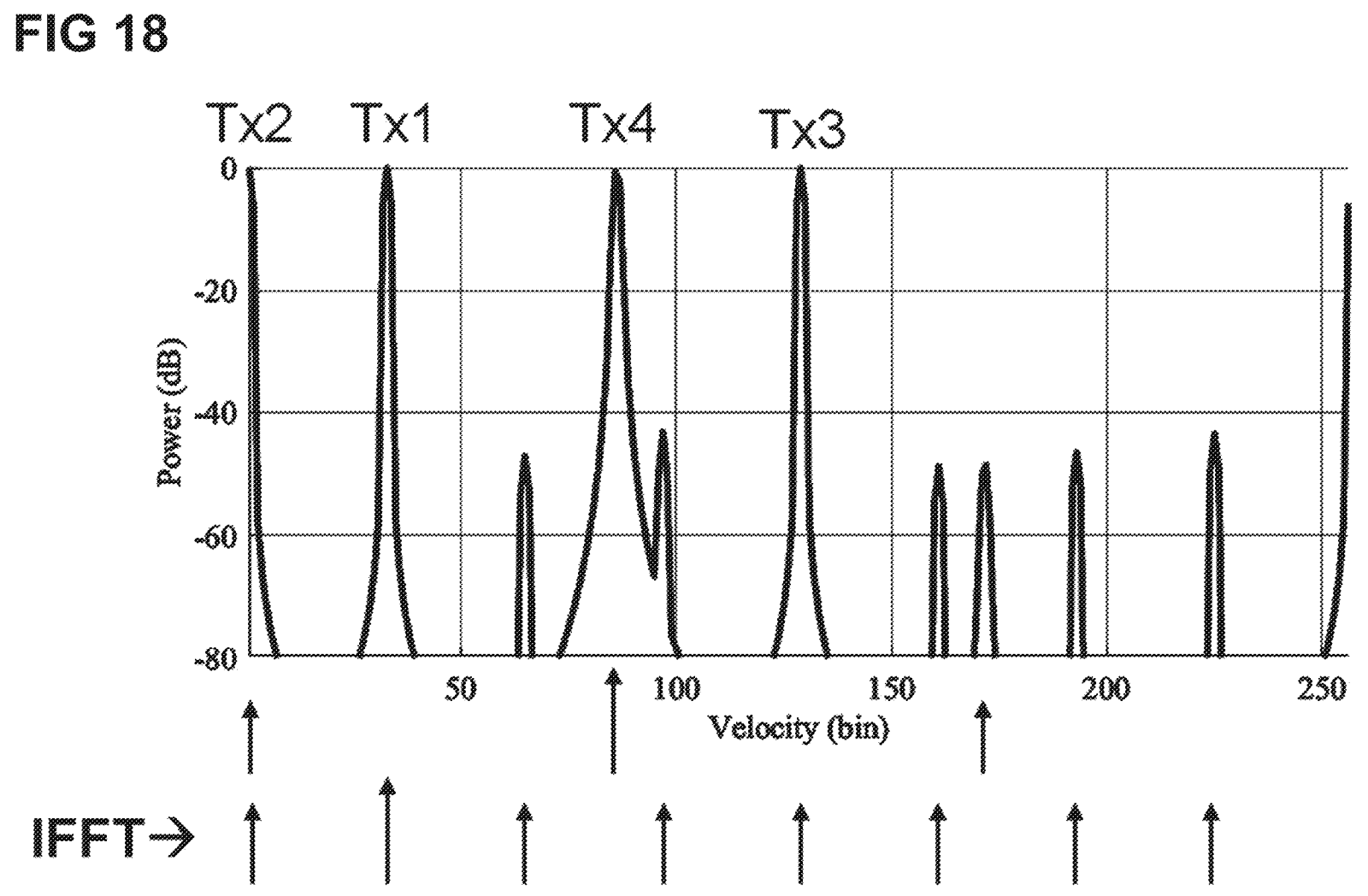

FIG. 18 illustrates the above example with four transmitters. It should be noted that while in the above example the DDM Pattern of TX4 is itself co-prime to the DDM pattern of TX1, this is not necessary and it is for example also possible that TX4 is set to 6PSK. Although 6 is not co-prime to 8 (i.e. to the order of the DDM pattern of TX1), it has a divisor (namely 3) which is co-prime to 8. However, the patterns are set such that equation (3) is still being respected (so e.g. TX1 is set to 16 PSK or TX3 is set to 1PSK to compensate the fact that the greatest common divisor of the order of the DDM pattern of TX1 and the order of the DDM pattern of TX4 is now 2).

The usage of one or more DDM patterns having orders having a divisor co-prime to the order of the DDM pattern of the transmitter to be calibrated allows scaling to a higher number of transmitters without requiring higher order constellations. It should be noted that "having a divisor co-prime" to the order of a given pattern means that it has a non-trivial divisor (i.e. higher than 1) or, equivalently, that it has a prime factor co-prime to the order of the given pattern. It should be noted that 1 is not considered as prime number, i.e. the term prime factor refers to a (prime) number which is equal or higher than two. Further, it should be noted that a divisor which is co-prime to a given order implies that the divisor is at least two (since 1 is not co-prime to any other number).

Figure 19:
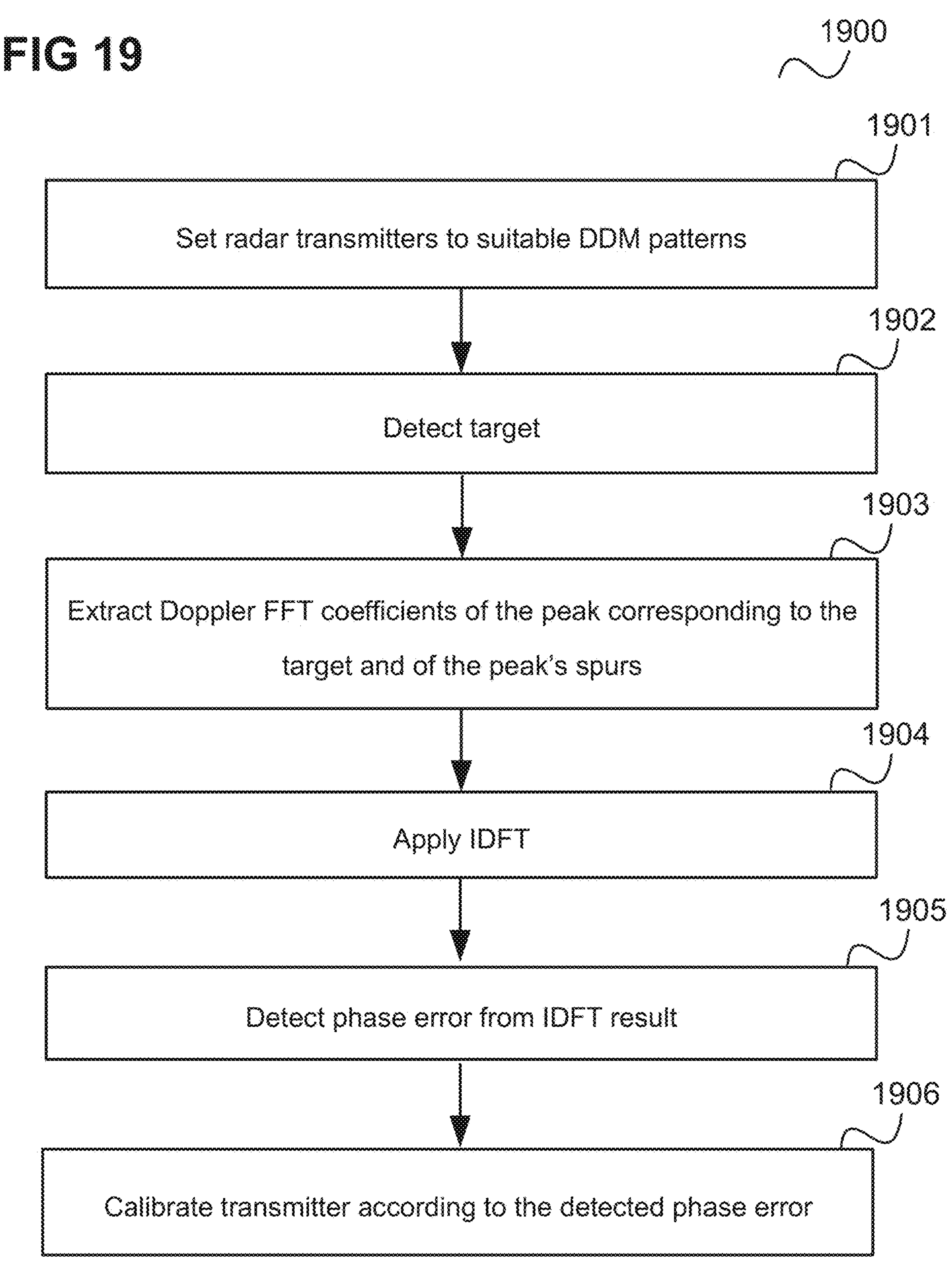
FIG. 19 shows a flow diagram illustrating an example method for calibrating a transmitter of a radar system according to an embodiment.

In summary, according to various embodiments, a method is provided as illustrated in FIG. 19 (following the second approach).

FIG. 19 shows a flow diagram illustrating a method for calibrating a transmitter of a radar system according to an embodiment.

In 1901, a radar transmitter to be calibrated among the plurality of radar transmitters is set to a first Doppler Division Multiplexing pattern and each of the other transmitters of the plurality of transmitters is associated with a respective second Doppler Division Multiplexing pattern, wherein the order of at least one (or more than one, e.g. two, three or even more) of the second Doppler Division Multiplexing patterns has a (non-trivial, i.e. at least two) divisor co-prime to the order of the first Doppler Division Multiplexing pattern (i.e. the order of at least one of the second DDM patterns has at least one prime factor different from all prime factors of the order of the first DDM pattern), such that it holds that

- the order of the first Doppler Division Multiplexing pattern divided by a product which comprises, for each second DDM pattern, a factor equal to the greatest common divisor of the order of the second Doppler Division Multiplexing pattern and the order of the first Doppler Division Multiplexing pattern, is greater than two. In other words, according to various embodiments, the product is equal to the product of a set of factors, wherein the set of factors includes, for each second DDM pattern, a factor equal to the greatest common divisor of the order of the second Doppler Division Multiplexing pattern and the order of the first Doppler Division Multiplexing pattern (and, for example, no other factors). The order of the first Doppler Division Multiplexing pattern divided by this product is greater than two. See equation (3) for an exemplary formulation of this requirement in form of a mathematical formula.

It may be optional that the order of at least one of the second Doppler Division Multiplexing patterns has a divisor co-prime to the order of the first Doppler Division Multiplexing pattern. This means that it is possible that none of the second Doppler Division Multiplexing patterns has a divisor co-prime to the order of the first Doppler Division Multiplexing pattern.

In 1902, a target is detected by performing radar detection with the plurality of transmitters, wherein the transmitter to be calibrated is operated with the first Doppler Division Multiplexing pattern and each of the other transmitters of plurality of transmitters is operated with its associated second Doppler Division Multiplexing pattern.

In 1903, Doppler Fourier transform coefficients for a Doppler spectrum peak corresponding to the target and for spurs associated with the peak are extracted.

In 1904, an inverse discrete Fourier transform is applied to the extracted Doppler Fourier transform coefficients.

In 1905, a phase error of the transmitter to be calibrated is determined using a result of the inverse discrete Fourier transform.

In 1906, the transmitter to be calibrated is calibrated according to the detected phase error.

According to various embodiments, in other words, a transmitter for which phase shifter errors (e.g. imbalance) should be estimated and which should be calibrated (i.e. whose phase errors should be compensated) is switched to a particular DDM pattern (i.e. DDM constellation) which makes it possible to estimate the phase shifter errors of the transmitter with (possibly all) other transmitters being enabled by setting at least one of the other transmitters to a DDM pattern with an order having a divisor co-prime to the order of the DDM pattern to which the transmitter to be calibrated is set. This may be done sequentially for all transmitters to be calibrated, thus allowing calibration of all transmitters without losing the detection capabilities during calibration. This allows maintaining optimal sensitivity and accuracy of a radar system during its life cycle without mid-life (costly) offline re-calibration. It may further be used to relax the End of Line (EoL) calibration effort (before deployment of the radar system).

It should be noted that according to various embodiments, two numbers being co-prime is understood as the orders not sharing a divisor (i.e. factor) bigger than one (i.e., in particular, do not share a prime factor, wherein 1 does not count as prime). It should be noted that by this definition, the order 1 is co-prime to every other order.

If multiple targets are detected, a (e.g. the most) prominent target is selected as "the detected target" (i.e. a target with a clear peak etc.). It should be noted that detecting a target typically involves solving ambiguity (according to a usual detection approach for a DDM radar system).

According to various embodiments, a radar device (or radar system), like for example illustrated in FIG. 1 (but not necessarily arranged in a vehicle) is provided which is configured to perform the method of FIG. 19.

Figure 20:
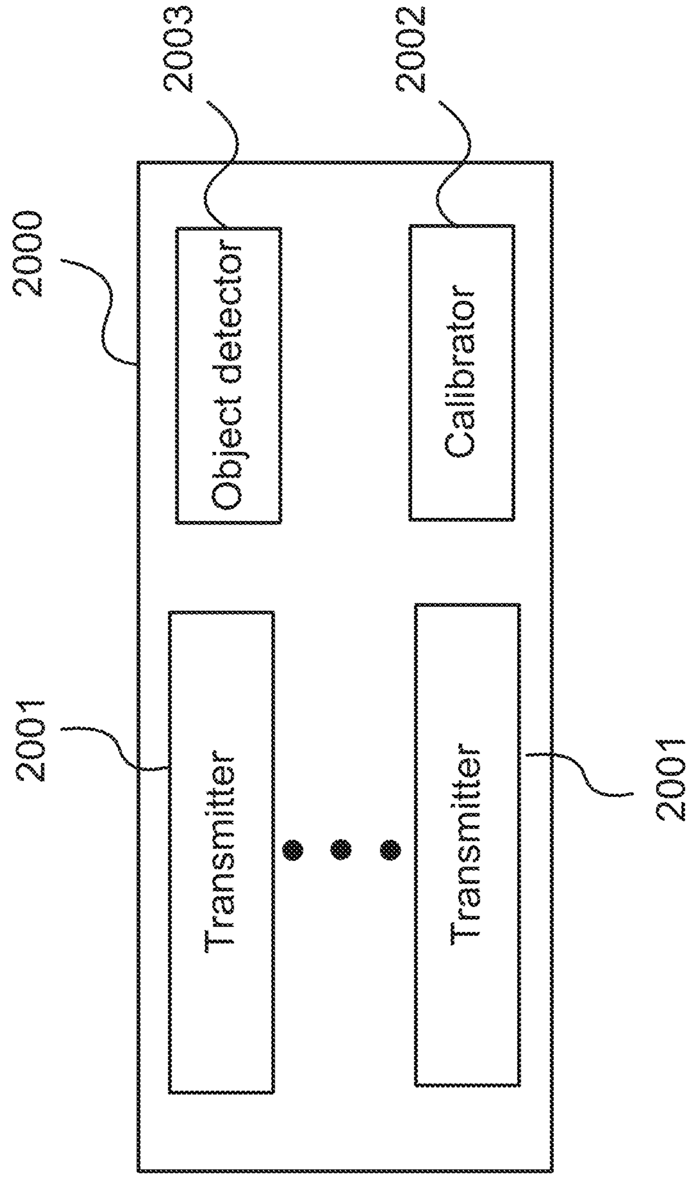
FIG. 20 shows an example radar system according to an embodiment.

FIG. 20 shows a radar system 2000 according to an embodiment. The radar system 2000 comprises a plurality of transmitters 2001.

Further, the radar system 2000 comprises a transmitter calibrator 2002 configured to set a radar transmitter to be calibrated among the plurality of radar transmitters to a first Doppler Division Multiplexing pattern and associate each of the other transmitters of the plurality of transmitters with a respective second Doppler Division Multiplexing pattern (i.e. with individual patterns, i.e. each of the plurality of transmitters is, according to one embodiment, associated with an individual pattern of a set of different patterns such that the transmitters (first transmitter and one or more second transmitters) are, according to one embodiment, all associated with different DDM patterns, i.e. the transmitters of any possible pair of transmitters of the plurality of transmitters are associated with different DDM patterns), wherein the order of at least one of the second Doppler Division Multiplexing patterns has a (non-trivial, i.e. at least two) divisor co-prime to the order of the first Doppler Division Multiplexing pattern, such that it holds that the order of the first Doppler Division Multiplexing pattern divided by a product which comprises, for each second DDM pattern, a factor equal to the greatest common divisor of the order of the second Doppler Division Multiplexing pattern and the order of the first Doppler Division Multiplexing pattern, is greater than two.

The radar system 2000 further comprises an object detector 2003 configured to detect a target by performing radar detection with the plurality of transmitters, wherein the transmitter to be calibrated is operated with the first Doppler Division Multiplexing pattern and each of the other transmitters of plurality of transmitters is operated with its associated second Doppler Division Multiplexing pattern.

The transmitter calibrator 2002 is configured to extract Doppler Fourier transform coefficients for a Doppler spectrum peak corresponding to the target and for spurs associated with the peak, apply an inverse discrete Fourier transform to the extracted Doppler Fourier transform coefficients, detect a phase error of the transmitter to be calibrated using a result of the inverse discrete Fourier transform and calibrate the transmitter to be calibrated according to the detected phase error.

The methods may be performed and the components of the radar devices (or radar systems) may be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which are described herein in more detail may also be understood as a "processor". In particular, the Doppler FFT state, the calibrator and the object detector. For example, the object detector and the range Fourier transform stage may be implemented by the radar signal processing circuit 111. They may be part of radar signal processing chain, e.g. implemented by one or more microcontrollers. The calibrator may at least partially also be implemented by the radar signal processing circuit 111 (e.g. for the constellation error estimation) and/or by additional circuitry (e.g. integrator and adders) like shown in FIG. 5.

According to various embodiments, a radar device (or radar system), like for example illustrated in FIG. 1 (but not necessarily arranged in a vehicle) is provided which is configured to perform the method of FIG. 14 and or FIG. 19.

The following examples pertain to further exemplary implementations.

Example 1a is a method as described with reference to FIG. 14.

Example 2a is the method of example 1a, wherein the result of the inverse discrete Fourier transform is an estimation of a modulation constellation of the transmitter to be calibrated.

Example 3a is the method of example 2a, wherein the phase error is a phase error of a constellation point of the modulation constellation of the transmitter.

Example 4a is the method of example 3a, comprising determining the phase error by comparing the estimation of the modulation constellation of the transmitter to be calibrated with a nominal modulation constellation of the transmitter to be calibrated.

Example 5a is the method of example 3a or 4a, wherein calibrating the transmitter to be calibrated according to the detected phase error comprises determining a compensation value for the constellation point having the phase error.

Example 6a is the method of any one of examples 3a to 5a, wherein detecting the phase error comprises fitting one or more circles to the estimated modulation constellation and determining an offset of a constellation point from a nominal position of the constellation point on one of the circles.

Example 7a is the method of any one of examples 1a to 6a, wherein detecting the target comprises determining a Doppler spectrum from signals received via one or more antennas and a peak detection within the Doppler spectrum, wherein the Doppler Fourier transform coefficients for the Doppler spectrum peak corresponding to the target and for the spurs associated with the peak are extracted from the Doppler spectrum.

Example 8a is the method of any one of examples 1a to 7a, wherein the Doppler Division Multiplexing patterns with which the transmitters are associated and the elevated Doppler Division Multiplexing patterns are one or more of an unmodulated pattern, a binary phase shift keying pattern, a quadrature phase shift keying pattern or a phase shift keying pattern of higher order.

Example 9a is a radar system as described with reference to FIG. 15.

Example 1b is a method for calibrating a transmitter of a radar system comprising a plurality of transmitters as described with reference to FIG. 19.

Example 2b is the method of example 1b, wherein the order of at least one of the second Doppler Division Multiplexing patterns is a prime number and co-prime to the order of the first Doppler Division Multiplexing pattern or includes at least one first prime factor co-prime to the order of the first Doppler Division Multiplexing pattern and at least one second prime factor shared with the order of the first Doppler Division Multiplexing pattern.

Example 3b is the method of example 1b or 2b, wherein the order of at least one of the second Doppler Division Multiplexing patterns has multiple prime factors co-prime to the order of the first Doppler Division Multiplexing pattern.

Example 4b is the method of any one of examples 1b to 3b, wherein the order of at least one of the second Doppler Division Multiplexing patterns is not co-prime to the order of the first Doppler Division Multiplexing pattern.

Example 5b is the method of any one of examples 1b to 4b, wherein the order of at least one of the second Doppler Division Multiplexing patterns does not have a divisor co-prime to the order of the first Doppler Division Multiplexing pattern.

Example 6b is the method of any one of examples 1b to 4b, wherein the orders of all second Doppler Division Multiplexing patterns each have a divisor co-prime to the order of the first Doppler Division Multiplexing pattern.

Example 7b is the method of any one of examples 1b to 6b, wherein the result of the inverse discrete Fourier transform is an estimation of a modulation constellation of the transmitter to be calibrated.

Example 8b is the method of example 7b, wherein the phase error is a phase error of a constellation point of the modulation constellation of the transmitter.

Example 9b is the method of example 8b, comprising determining the phase error by comparing the estimation of the modulation constellation of the transmitter to be calibrated with a nominal modulation constellation of the transmitter to be calibrated.

Example 10b is the method of example 8b or 9b, wherein calibrating the transmitter to be calibrated according to the detected phase error comprises determining a compensation value for the constellation point having the phase error.

Example 11b is the method of any one of examples 8b to 10b, wherein detecting the phase error comprises fitting one or more circles to the estimated modulation constellation and determining an offset of a constellation point from a nominal position of the constellation point on one of the circles.

Example 12b is the method of any one of examples 1b to 11b, wherein detecting the target comprises determining a Doppler spectrum from signals received via one or more antennas and a peak detection within the Doppler spectrum, wherein the Doppler Fourier transform coefficients for the Doppler spectrum peak corresponding to the target and for the spurs associated with the peak are extracted from the Doppler spectrum.

Example 13b is the method of any one of examples 1b to 12b, wherein the Doppler Division Multiplexing patterns with which the transmitters are associated and the first Doppler Division Multiplexing patterns are one or more of an unmodulated pattern, a binary phase shift keying pattern, a quadrature phase shift keying pattern or a phase shift keying pattern of higher order.

Example 14b is a radar system as described with reference to FIG. 20.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

We claim:

1. A method for calibrating a transmitter of a radar system comprising a plurality of transmitters, the method comprising:

setting a radar transmitter to be calibrated among the plurality of radar transmitters to a first Doppler Division Multiplexing pattern and associating each of the other transmitters of the plurality of transmitters with a respective second Doppler Division Multiplexing pattern such that it holds that the order of the first Doppler Division Multiplexing pattern divided by the product of the orders of the second Doppler Division Multiplexing patterns associated with the other transmitters of the plurality of transmitters is greater than two, and the constellation points of the second Doppler Division Multiplexing patterns associated with the other transmitters of the plurality of transmitters are included in the first Doppler Division Multiplexing pattern;

detecting a target by performing radar detection with the plurality of transmitters, wherein the transmitter to be calibrated is operated with the first Doppler Division Multiplexing pattern and each of the other transmitters of the plurality of transmitters is operated with its associated second Doppler Division Multiplexing pattern;

extracting Doppler Fourier transform coefficients for a Doppler spectrum peak corresponding to the target and for spurs associated with the peak;

applying an inverse discrete Fourier transform to the extracted Doppler Fourier transform coefficients;

detecting a phase error of the transmitter to be calibrated using a result of the inverse discrete Fourier transform; and calibrating the transmitter to be calibrated according to the detected phase error.

2. The method of claim 1, wherein the result of the inverse discrete Fourier transform is an estimation of a modulation constellation of the transmitter to be calibrated.

3. The method of claim 2, wherein the phase error is a phase error of a constellation point of the modulation constellation of the transmitter.

4. The method of claim 3, comprising determining the phase error by comparing the estimation of the modulation constellation of the transmitter to be calibrated with a nominal modulation constellation of the transmitter to be calibrated.

5. The method of claim 3, wherein calibrating the transmitter to be calibrated according to the detected phase error comprises determining a compensation value for the constellation point having the phase error.

6. The method of claim 3, wherein detecting the phase error comprises fitting one or more circles to the estimated modulation constellation and determining an offset of a constellation point from a nominal position of the constellation point on one of the circles.

7. The method of claim 1, wherein detecting the target comprises determining a Doppler spectrum from signals received via one or more antennas and performing a peak detection within the Doppler spectrum, wherein the Doppler Fourier transform coefficients for the Doppler spectrum peak corresponding to the target and for the spurs associated with the peak are extracted from the Doppler spectrum.

8. The method of claim 1, wherein the Doppler Division Multiplexing patterns with which the transmitters are associated and the first Doppler Division Multiplexing patterns are one or more of an unmodulated pattern, a binary phase shift keying pattern, a quadrature phase shift keying pattern or a phase shift keying pattern of higher order.

9. The method of claim 1, wherein the order of at least one of the second Doppler Division Multiplexing patterns has a divisor co-prime to the order of the first Doppler Division Multiplexing pattern, such that it holds that the order of the first Doppler Division Multiplexing pattern divided by a product which comprises, for each second DDM pattern, a factor equal to the greatest common divisor of the order of the second Doppler Division Multiplexing pattern and the order of the first Doppler Division Multiplexing pattern, is greater than two.

10. The method of claim 9, wherein the order of at least one of the second Doppler Division Multiplexing patterns is a prime number and co-prime to the order of the first Doppler Division Multiplexing pattern or includes at least one first prime factor co-prime to the order of the first Doppler Division Multiplexing pattern and at least one second prime factor shared with the order of the first Doppler Division Multiplexing pattern.

11. The method of claim 9, wherein the order of at least one of the second Doppler Division Multiplexing patterns has multiple prime factors co-prime to the order of the first Doppler Division Multiplexing pattern.

12. The method of claim 9, wherein the order of at least one of the second Doppler Division Multiplexing patterns is not co-prime to the order of the first Doppler Division Multiplexing pattern.

13. The method of claim 9, wherein the order of at least one of the second Doppler Division Multiplexing patterns does not have a divisor co-prime to the order of the first Doppler Division Multiplexing pattern.

14. The method of claim 9, wherein the orders of all second Doppler Division Multiplexing patterns each have a divisor co-prime to the order of the first Doppler Division Multiplexing pattern.

15. A radar system comprising:

a plurality of transmitters;

a transmitter calibrator configured to set a radar transmitter to be calibrated among the plurality of radar transmitters to a first Doppler Division Multiplexing pattern and associate each of the other transmitters of the plurality of transmitters with a respective second Doppler Division Multiplexing pattern such that it holds that the order of the first Doppler Division Multiplexing pattern divided by the product of the orders of the second Doppler Division Multiplexing patterns associated with the other transmitters of the plurality of transmitters is greater than two and the constellation points of the second Doppler Division Multiplexing patterns associated with the other transmitters of the plurality of transmitters are included in the first Doppler Division Multiplexing pattern; and an object detector configured to detect a target by performing radar detection with the plurality of transmitters, wherein the transmitter to be calibrated is operated with the first Doppler Division Multiplexing pattern and each of the other transmitters of the plurality of transmitters is operated with its associated second Doppler Division Multiplexing pattern;

wherein the transmitter calibrator is configured to extract Doppler Fourier transform coefficients for a Doppler spectrum peak corresponding to the target and for spurs associated with the peak, apply an inverse discrete Fourier transform to the extracted Doppler Fourier transform coefficients, detect a phase error of the transmitter to be calibrated using a result of the inverse discrete Fourier transform, and calibrate the transmitter to be calibrated according to the detected phase error.

16. The radar system of claim 15, wherein the object detector is configured to detect the target by determining a Doppler spectrum from signals received via one or more antennas and performing a peak detection within the Doppler spectrum, wherein the Doppler Fourier transform coefficients for the Doppler spectrum peak corresponding to the target and for the spurs associated with the peak are extracted from the Doppler spectrum.

17. The radar system of claim 15, wherein the Doppler Division Multiplexing patterns with which the transmitters are associated and the first Doppler Division Multiplexing patterns are one or more of an unmodulated pattern, a binary phase shift keying pattern, a quadrature phase shift keying pattern or a phase shift keying pattern of higher order.

18. The radar system of claim 15, wherein the order of at least one of the second Doppler Division Multiplexing patterns has a divisor co-prime to the order of the first Doppler Division Multiplexing pattern, such that it holds that the order of the first Doppler Division Multiplexing pattern divided by a product which comprises, for each second DDM pattern, a factor equal to the greatest common divisor of the order of the second Doppler Division Multiplexing pattern and the order of the first Doppler Division Multiplexing pattern, is greater than two.

19. The radar system of claim 18, wherein the order of at least one of the second Doppler Division Multiplexing patterns is a prime number and co-prime to the order of the first Doppler Division Multiplexing pattern or includes at least one first prime factor co-prime to the order of the first Doppler Division Multiplexing pattern and at least one second prime factor shared with the order of the first Doppler Division Multiplexing pattern.

20. The radar system of claim 18, wherein the order of at least one of the second Doppler Division Multiplexing patterns has multiple prime factors co-prime to the order of the first Doppler Division Multiplexing pattern.

21. The radar system of claim 18, wherein the order of at least one of the second Doppler Division Multiplexing patterns is not co-prime to the order of the first Doppler Division Multiplexing pattern.

22. The radar system of claim 18, wherein the order of at least one of the second Doppler Division Multiplexing patterns does not have a divisor co-prime to the order of the first Doppler Division Multiplexing pattern.

23. The radar system of claim 18, wherein the orders of all second Doppler Division Multiplexing patterns each have a divisor co-prime to the order of the first Doppler Division Multiplexing pattern.

* * * * *